Feb. 24, 1925.
A. KADOW
1,527,559
GLASS BLOWING MECHANISM
Original Filed July 6, 1910   24 Sheets-Sheet 7
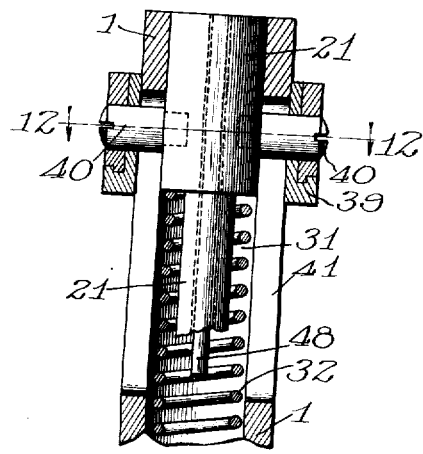
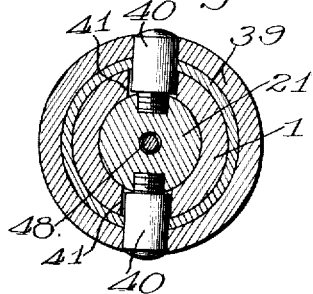
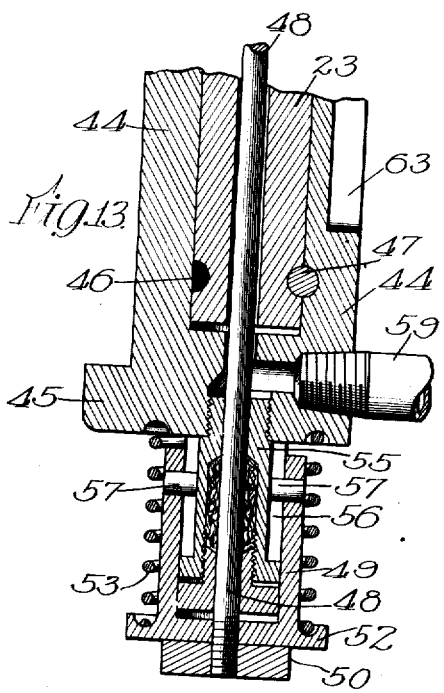
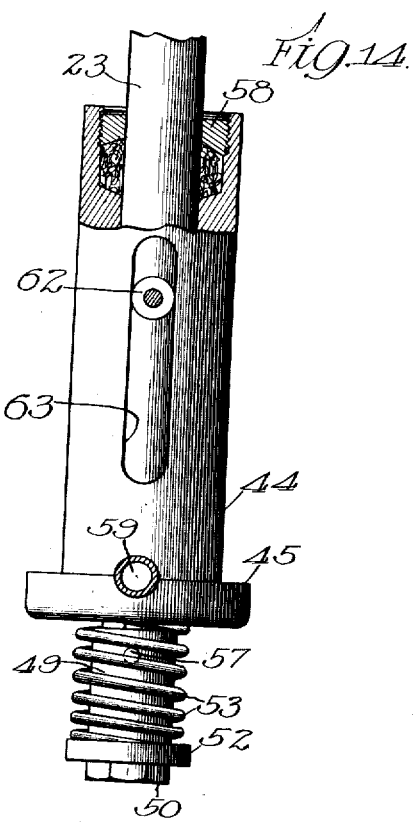

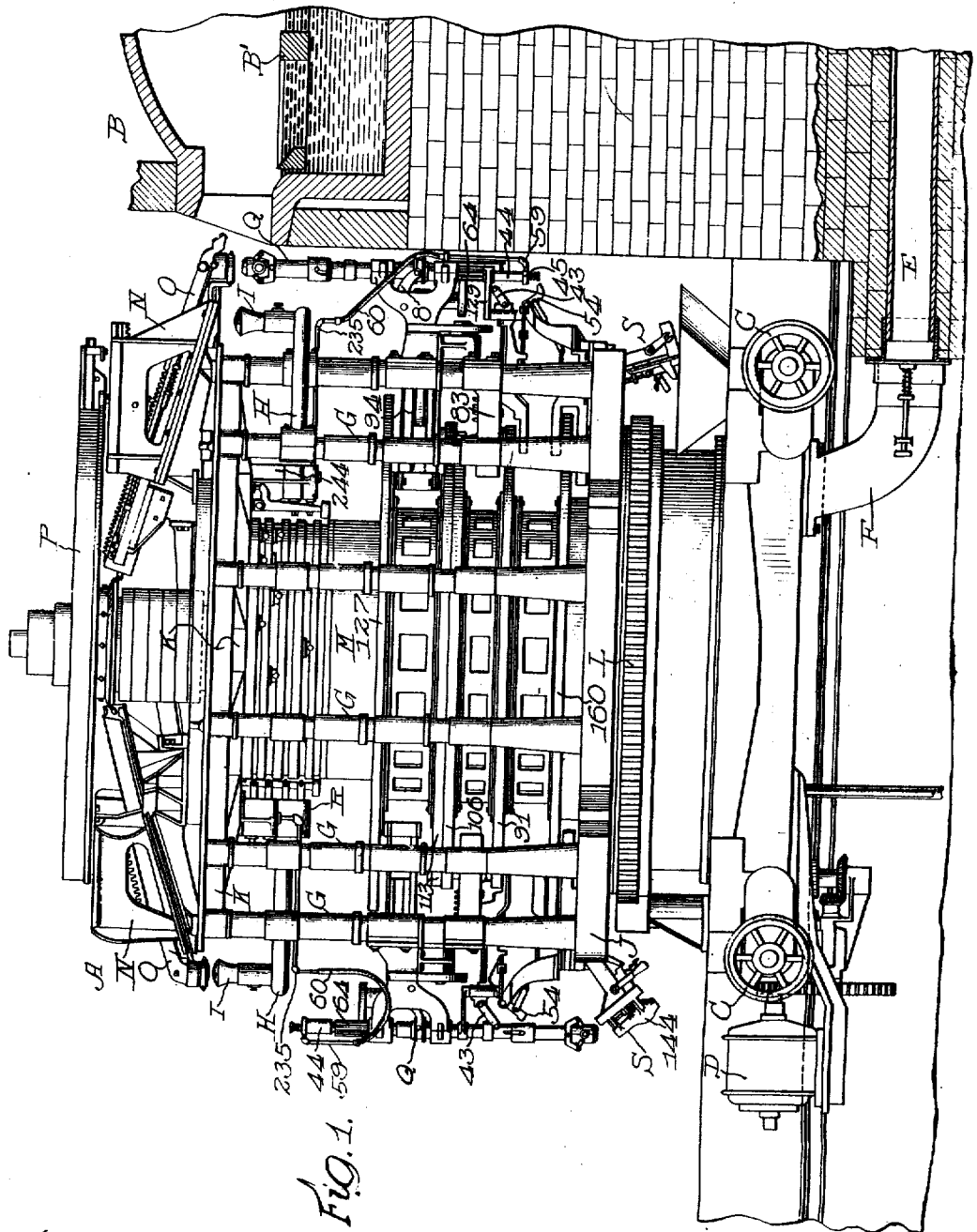

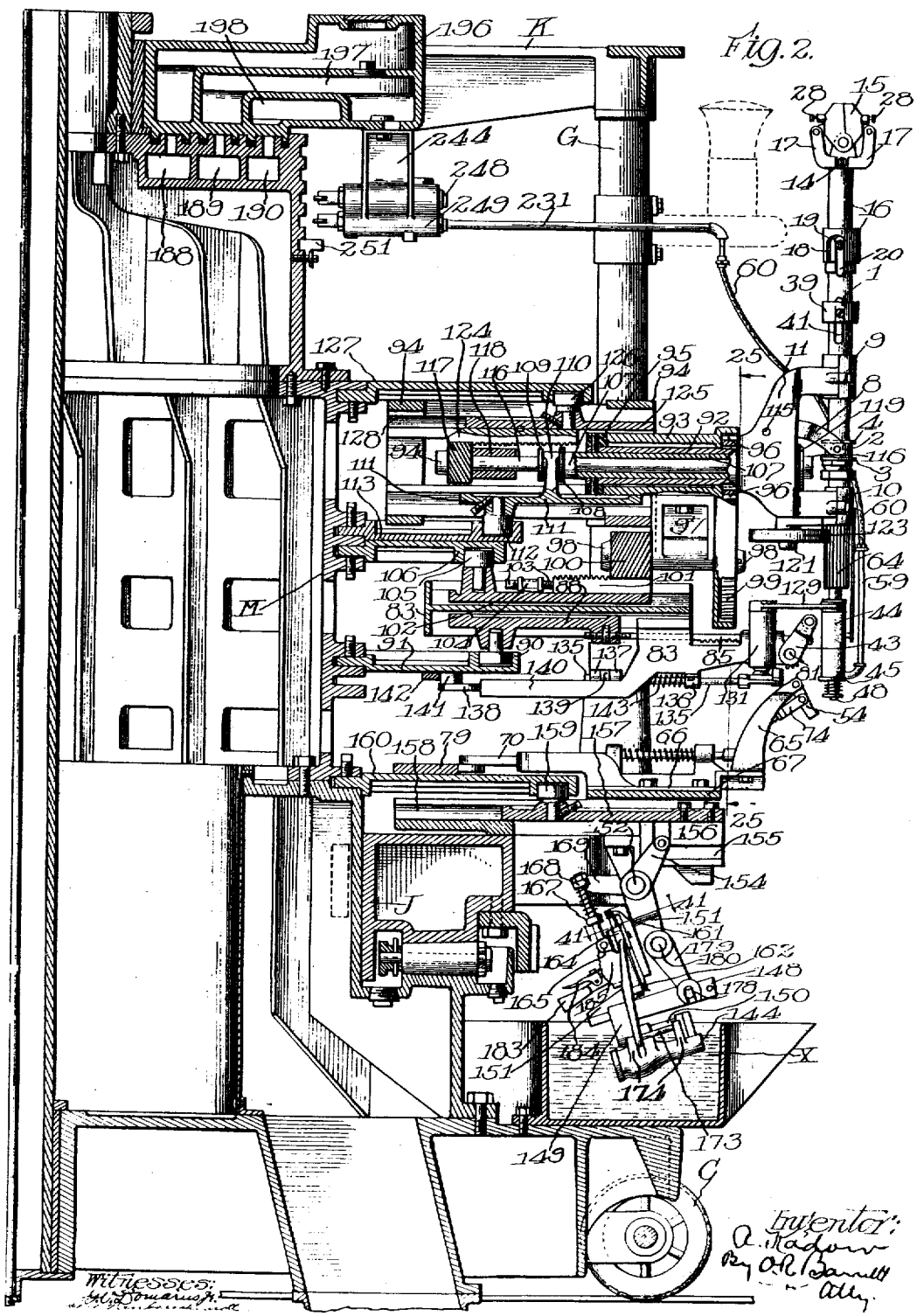

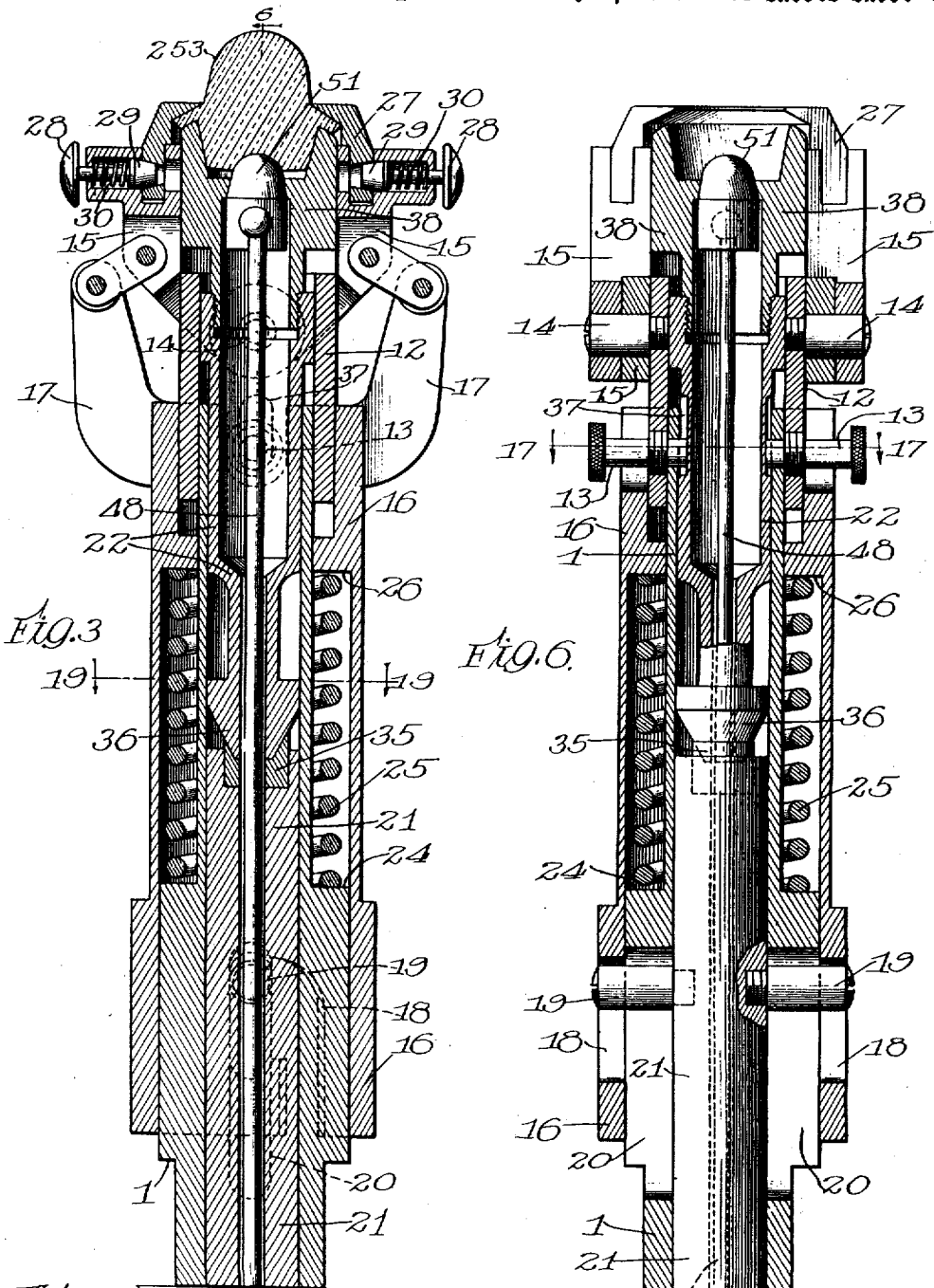

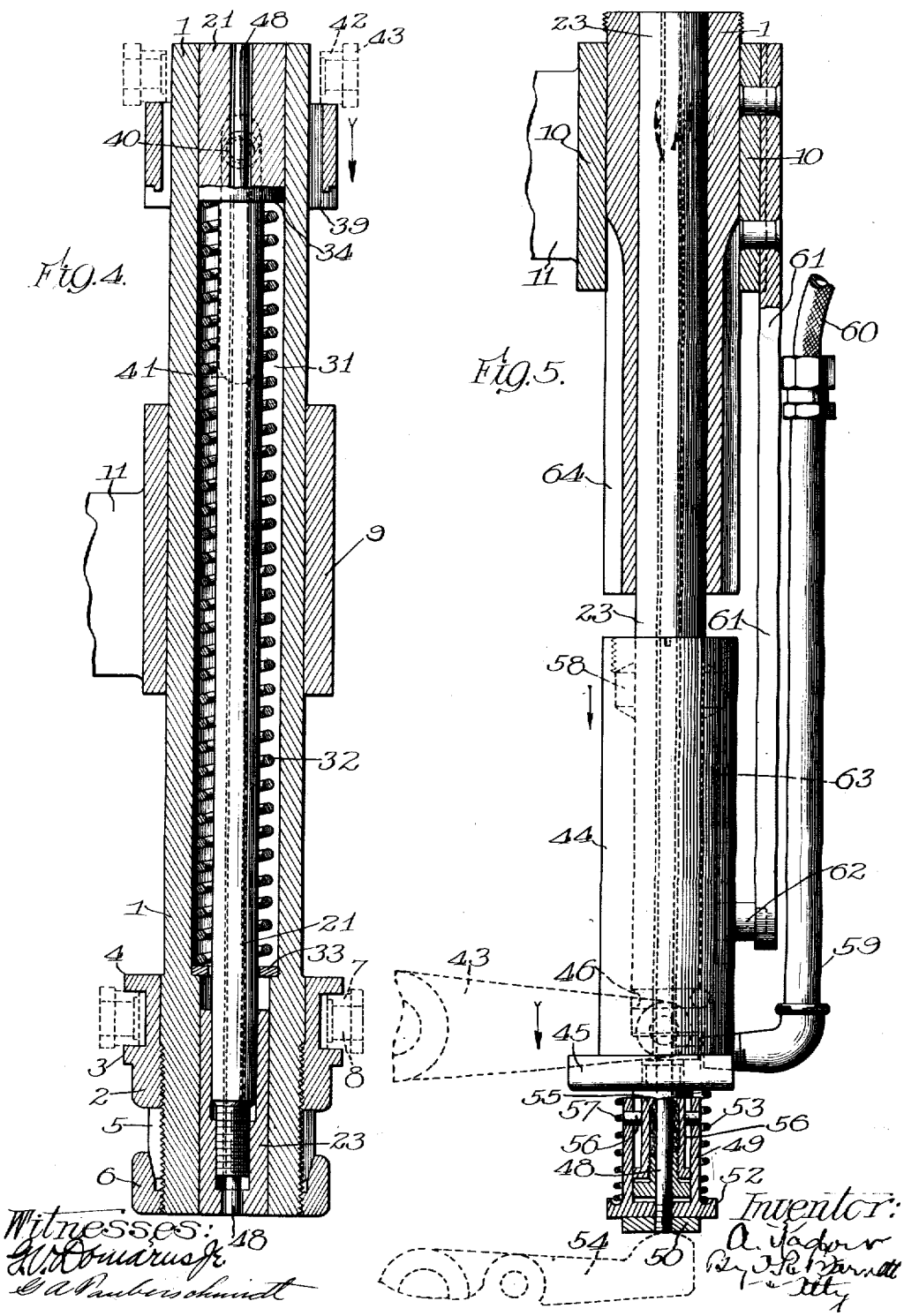

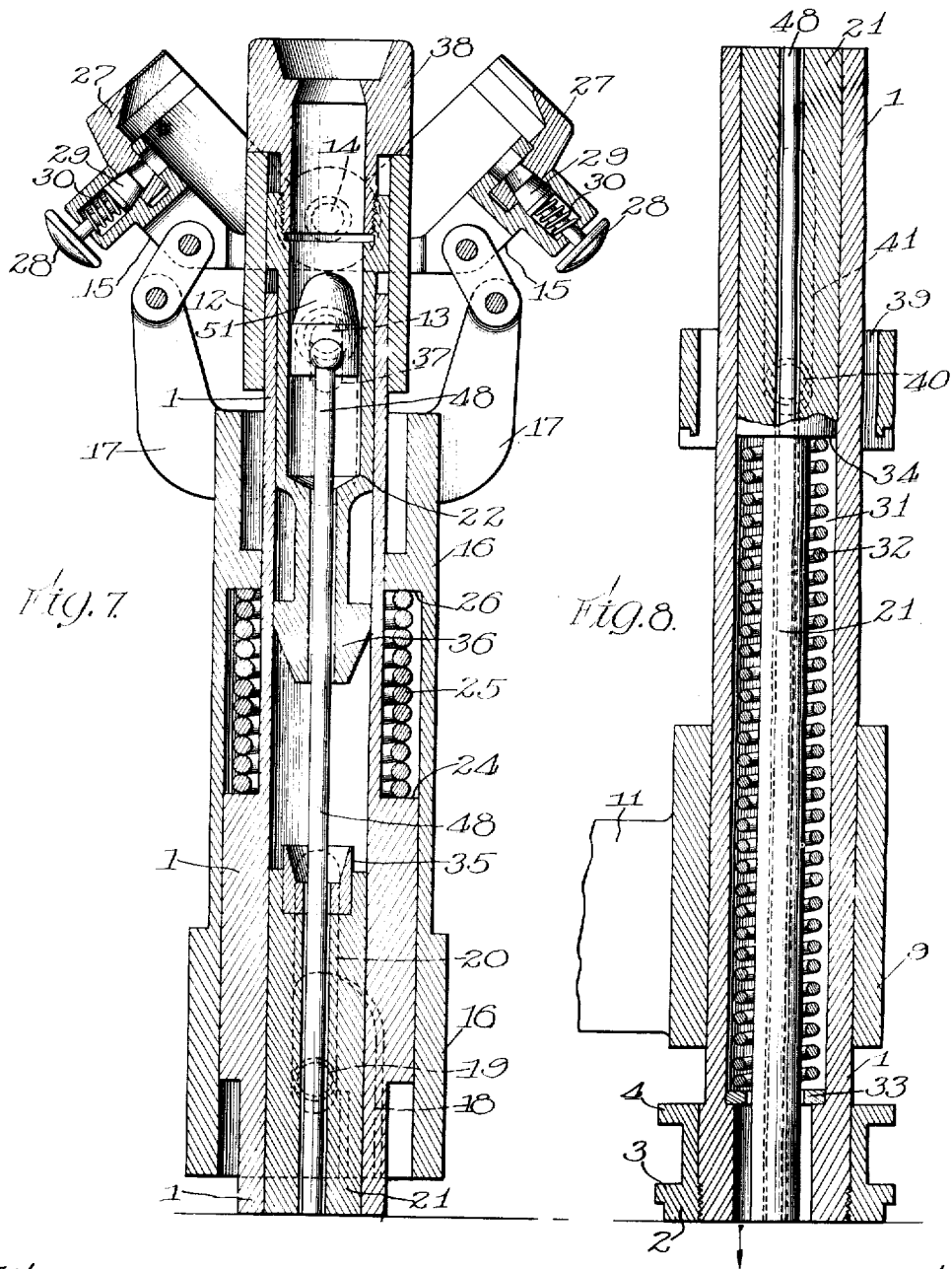

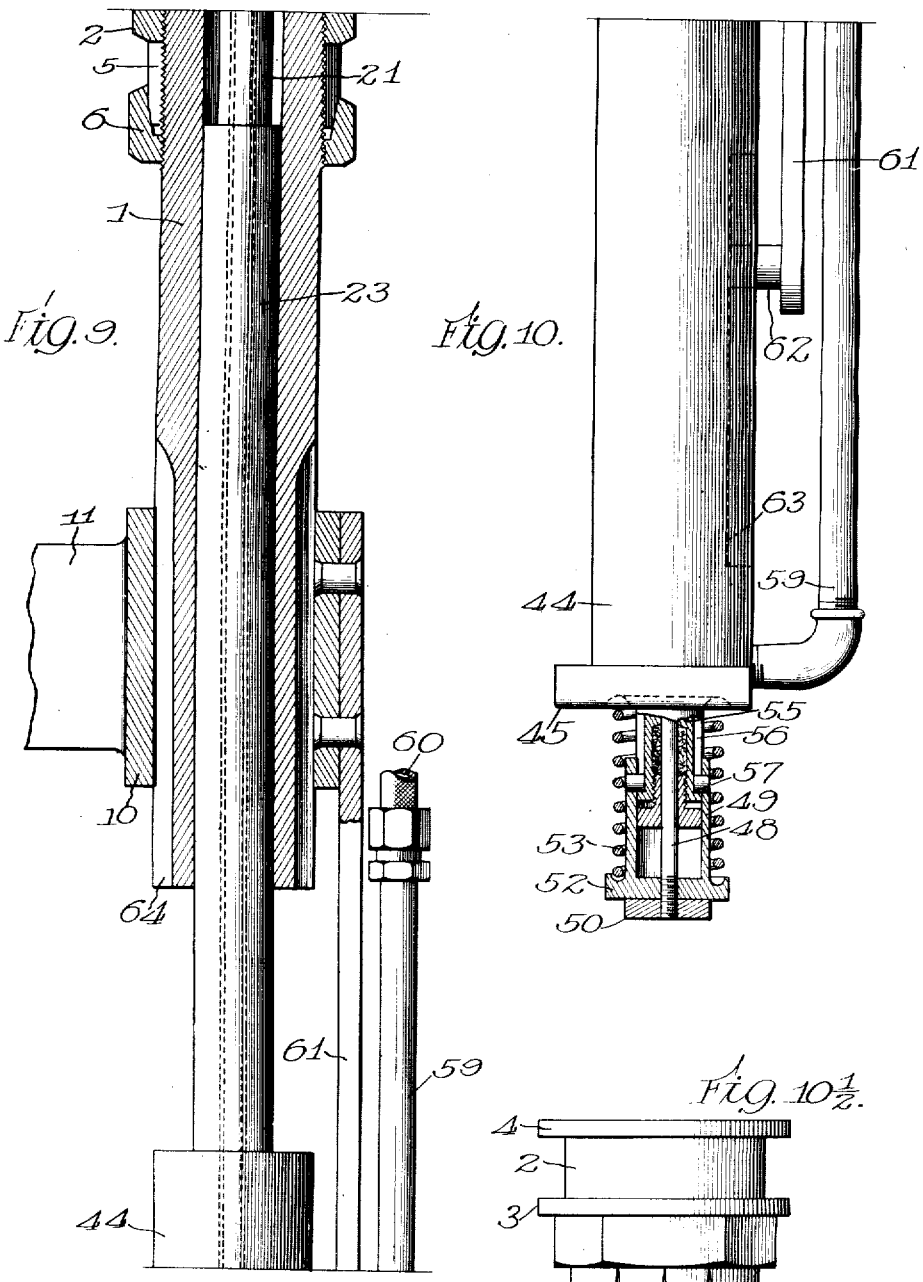

Feb. 24, 1925.
A. KADOW
1,527,559
GLASS BLOWING MECHANISM
Original Filed July 6, 1910 24 Sheets-Sheet 8
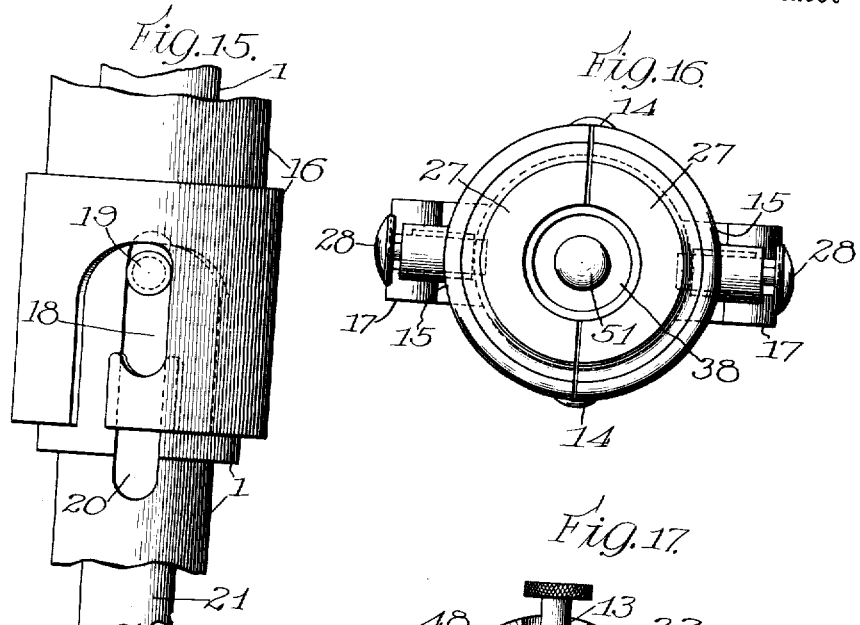
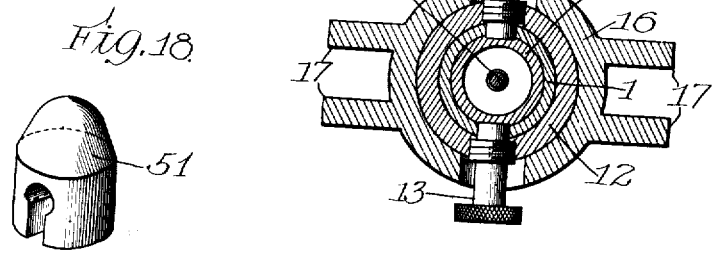
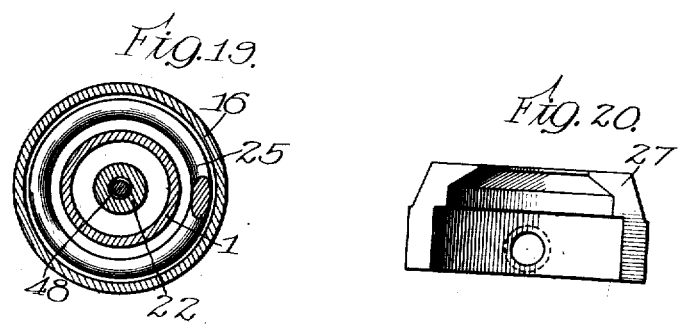

Feb. 24, 1925.  
A. KADOW  
1,527,559  
GLASS BLOWING MECHANISM  
Original Filed July 6, 1910  24 Sheets-Sheet 9
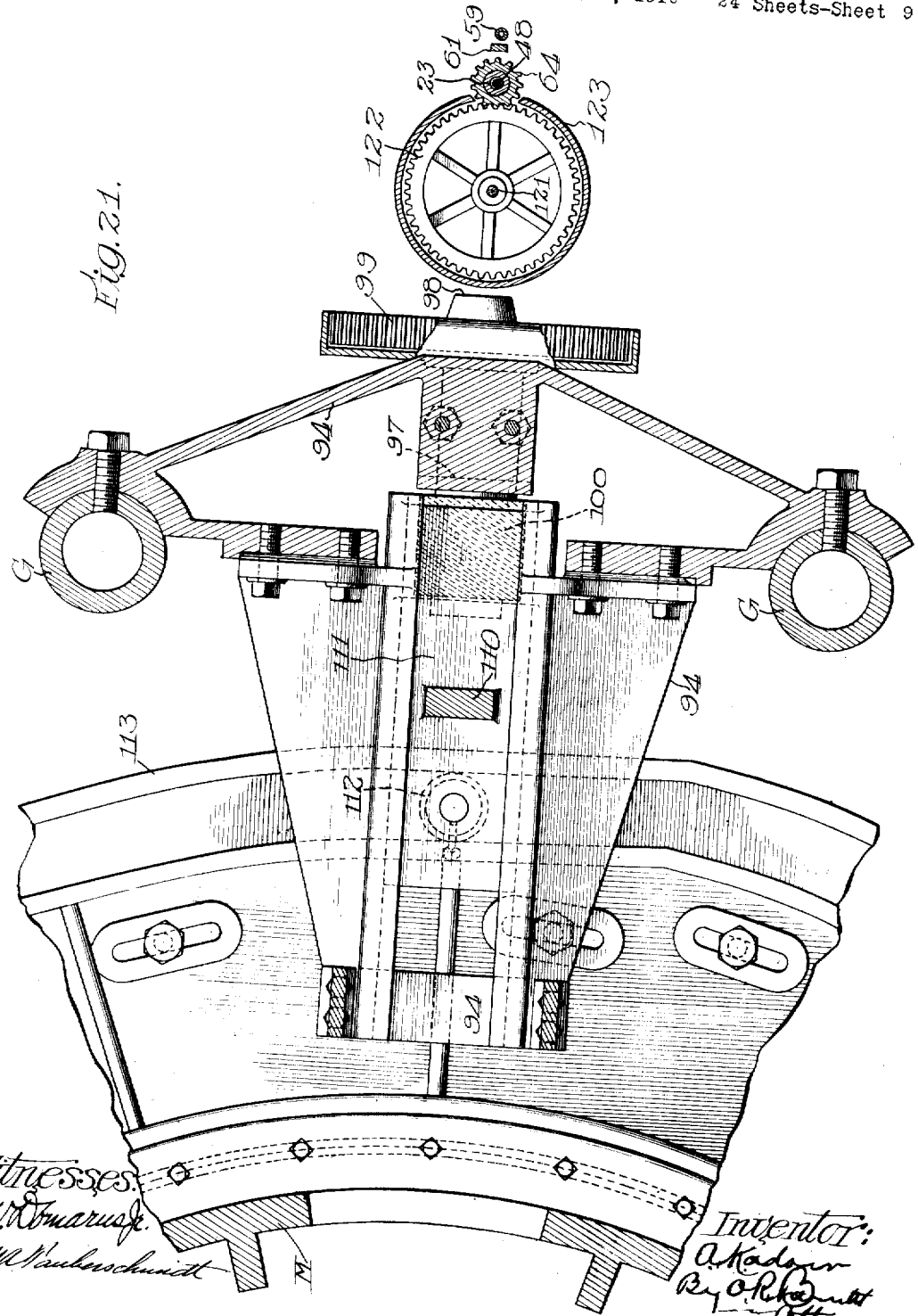

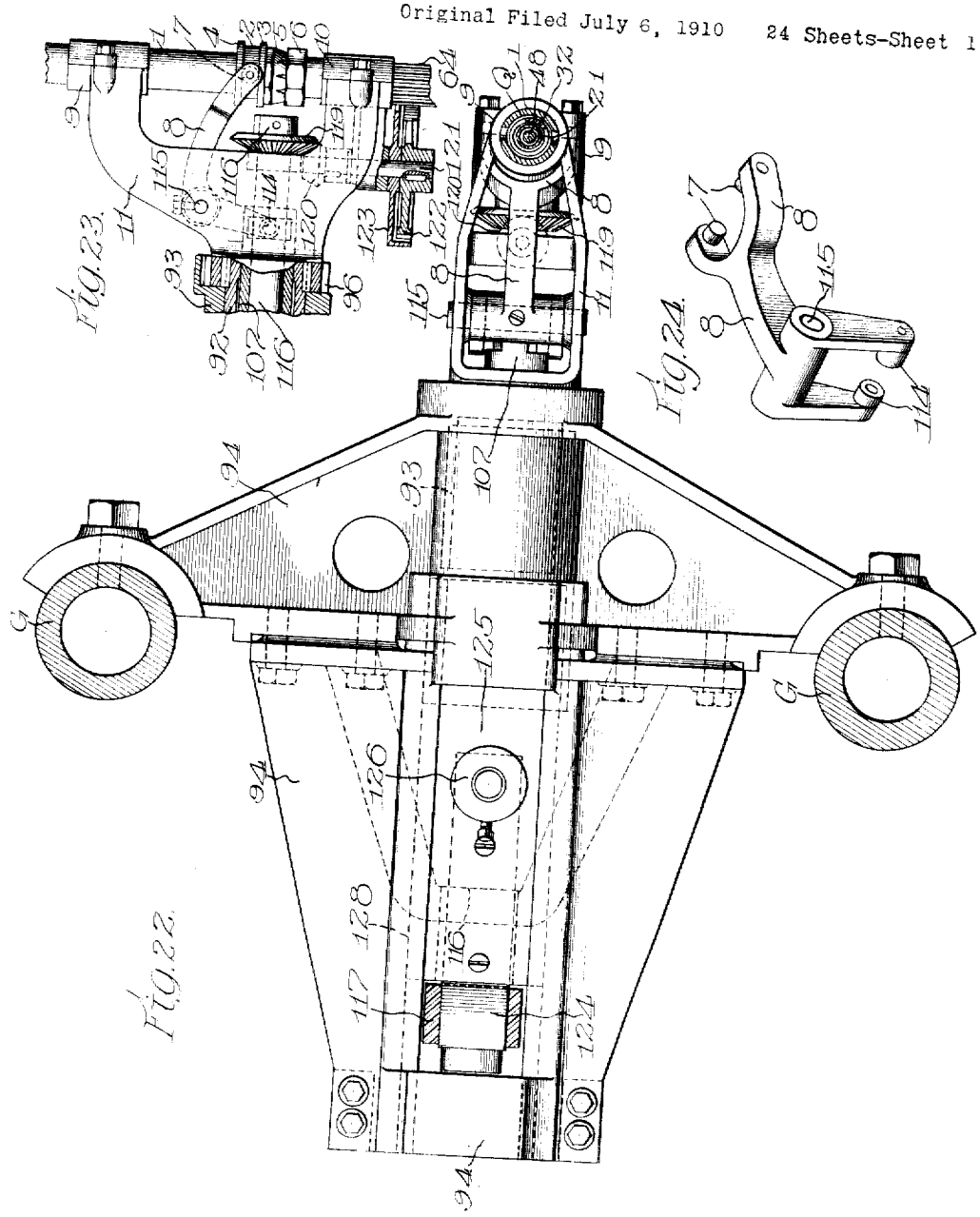

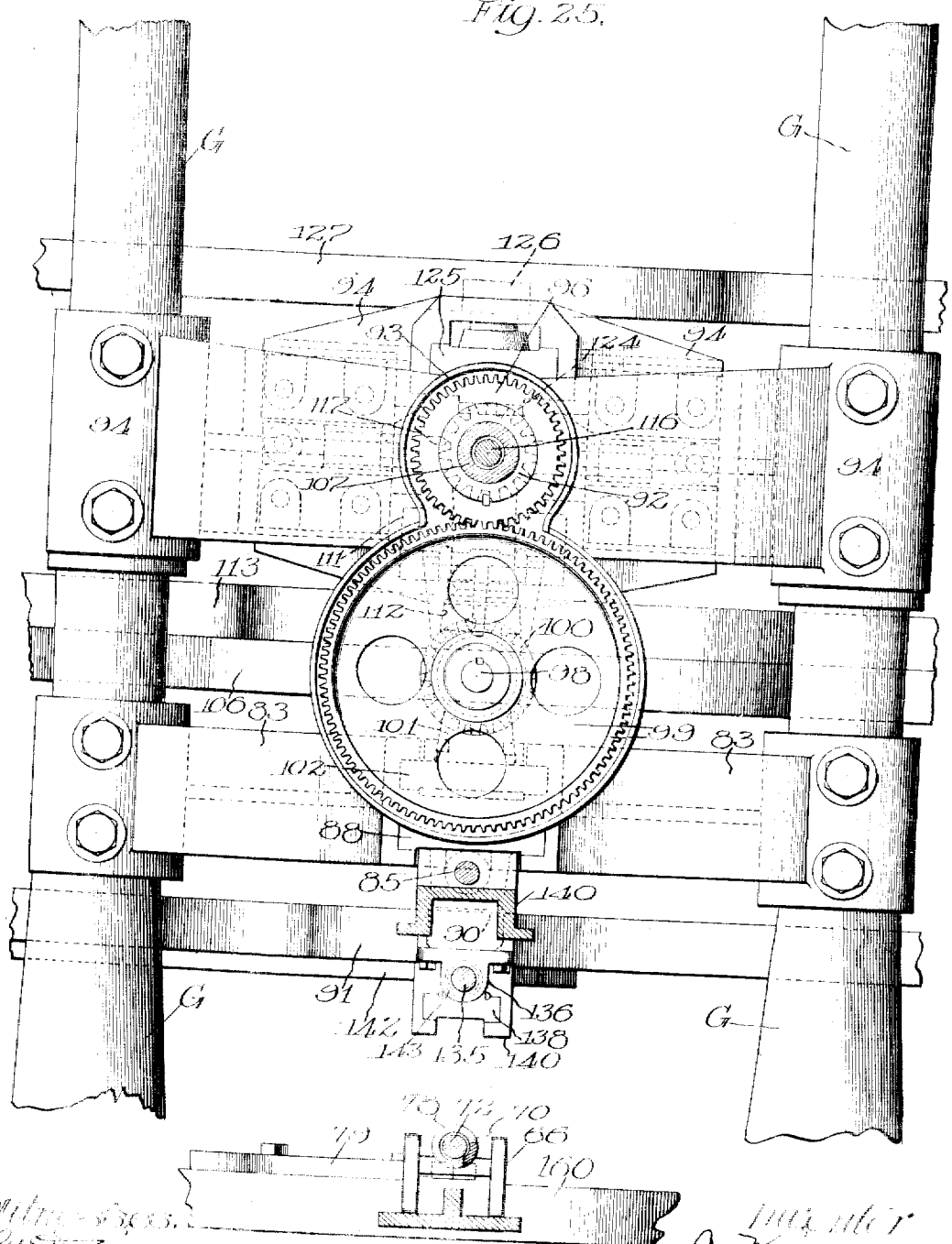

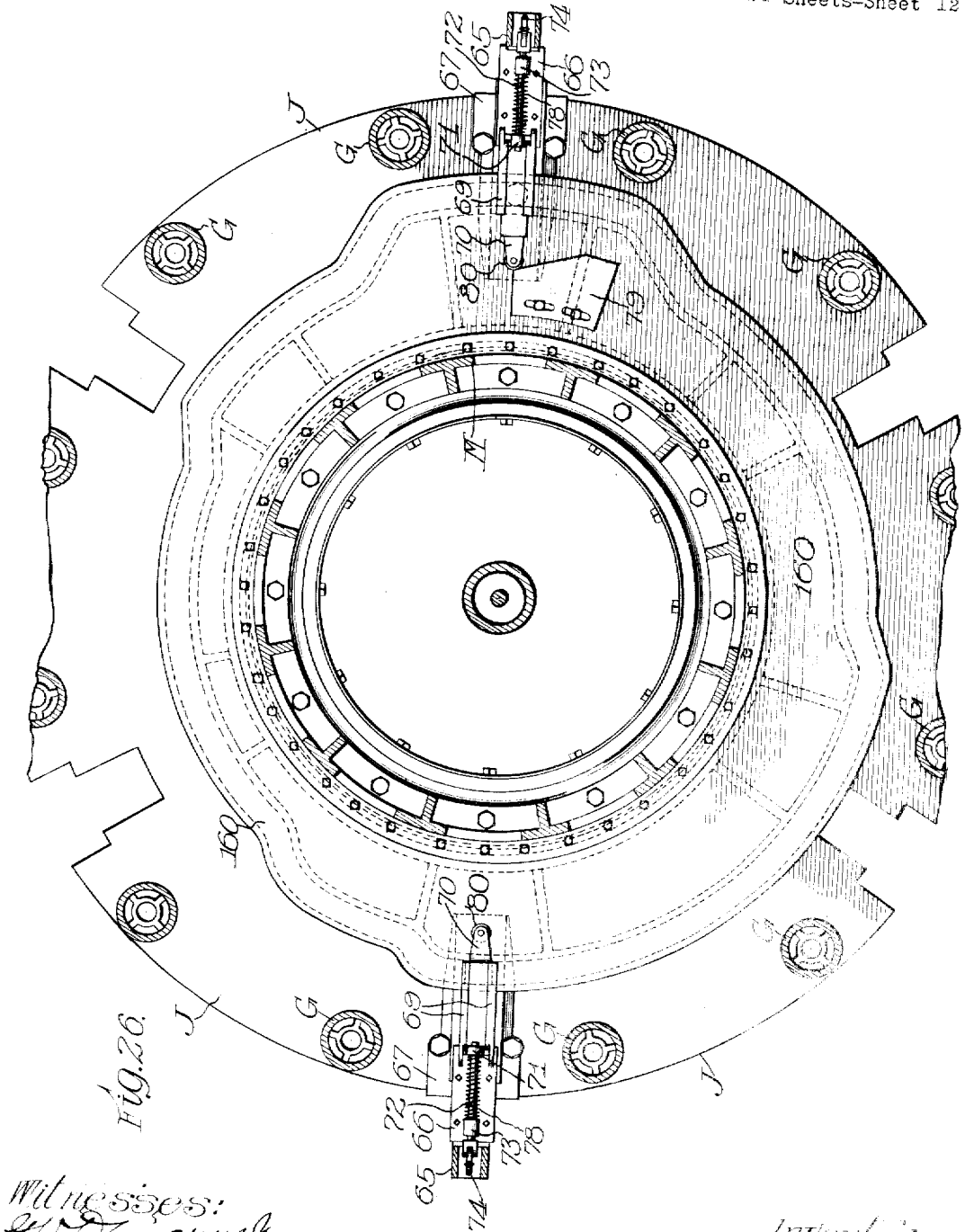

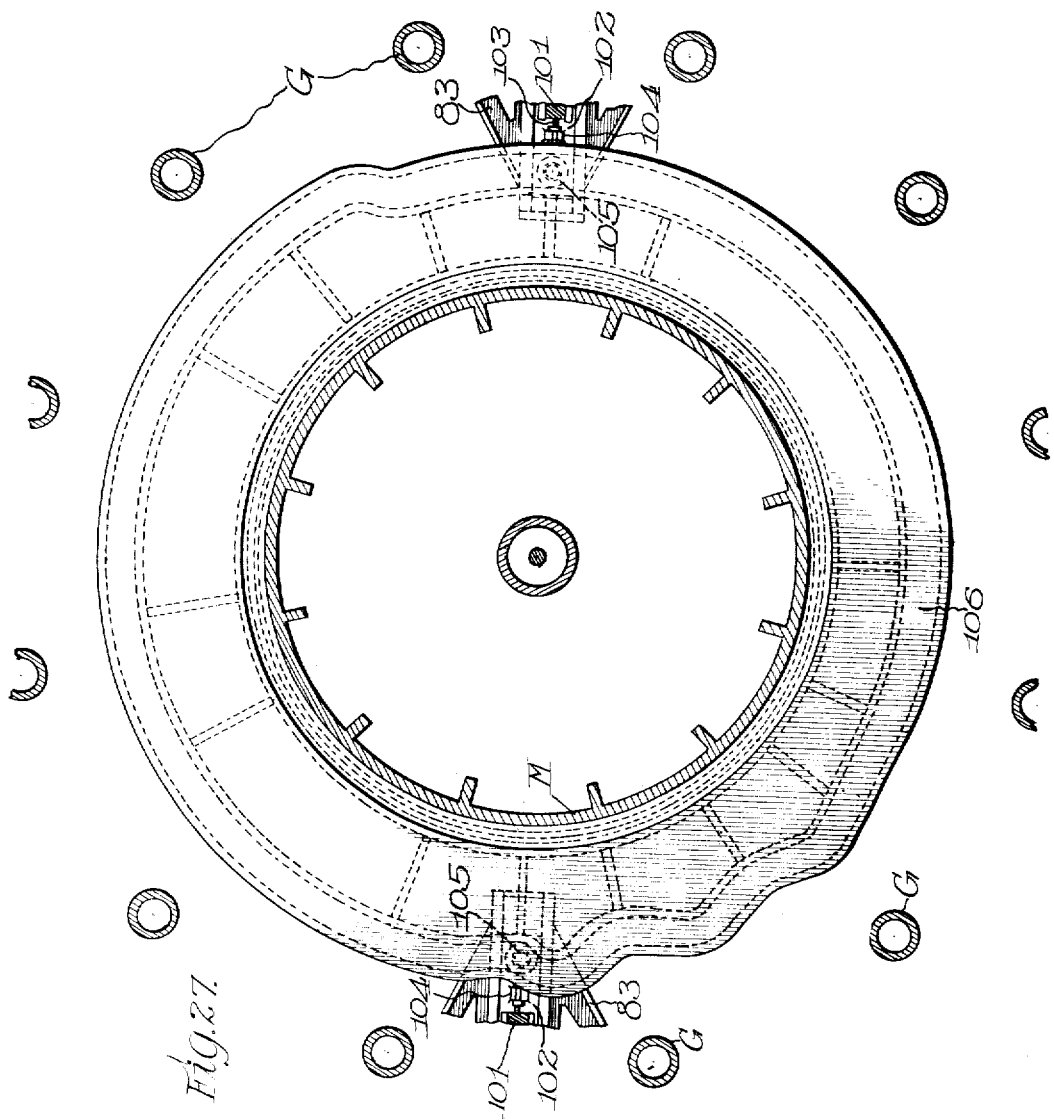

Feb. 24, 1925.
A. KADOW
1,527,559
GLASS BLOWING MECHANISM
Original Filed July 6, 1910   24 Sheets-Sheet 14
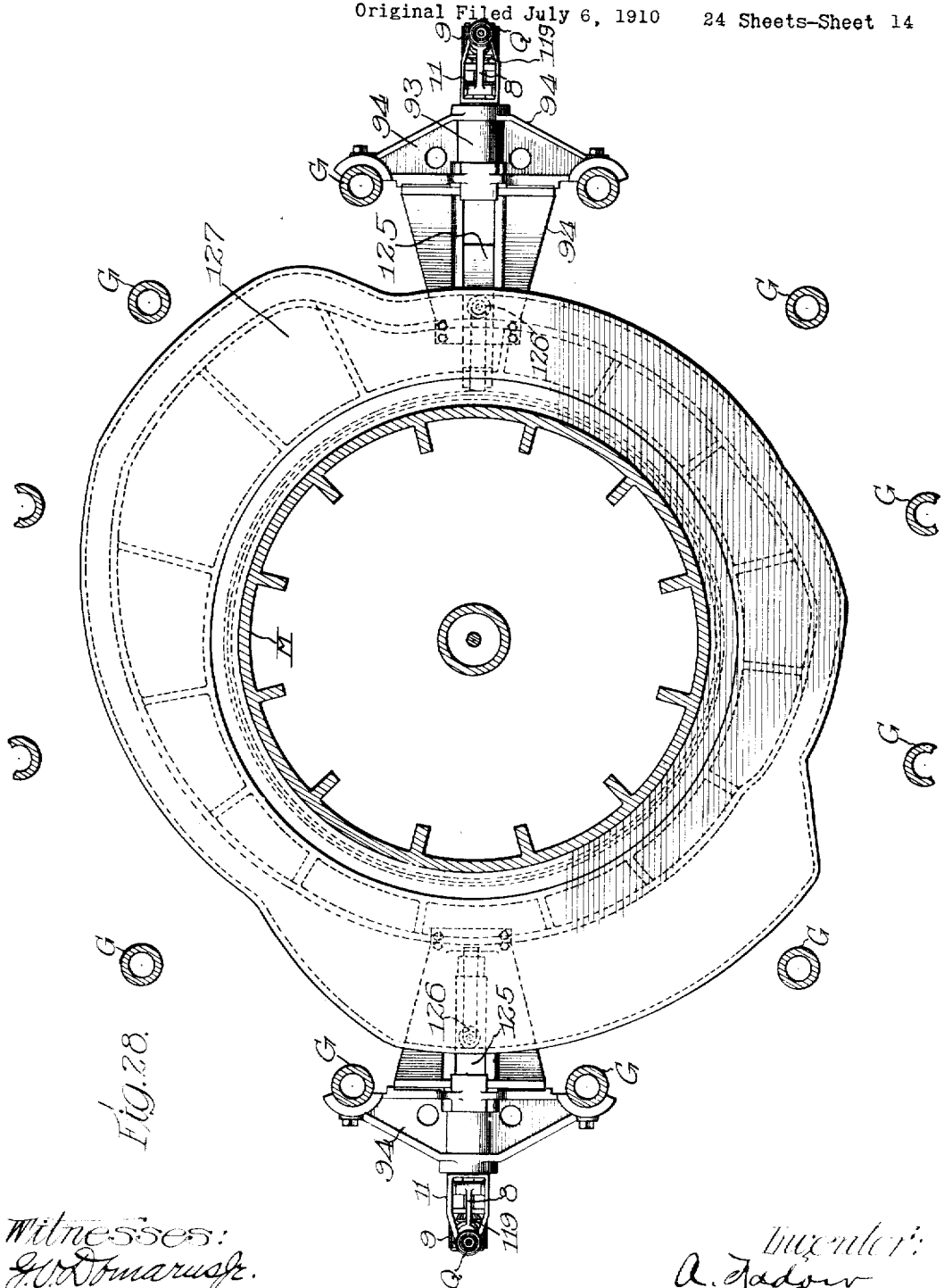

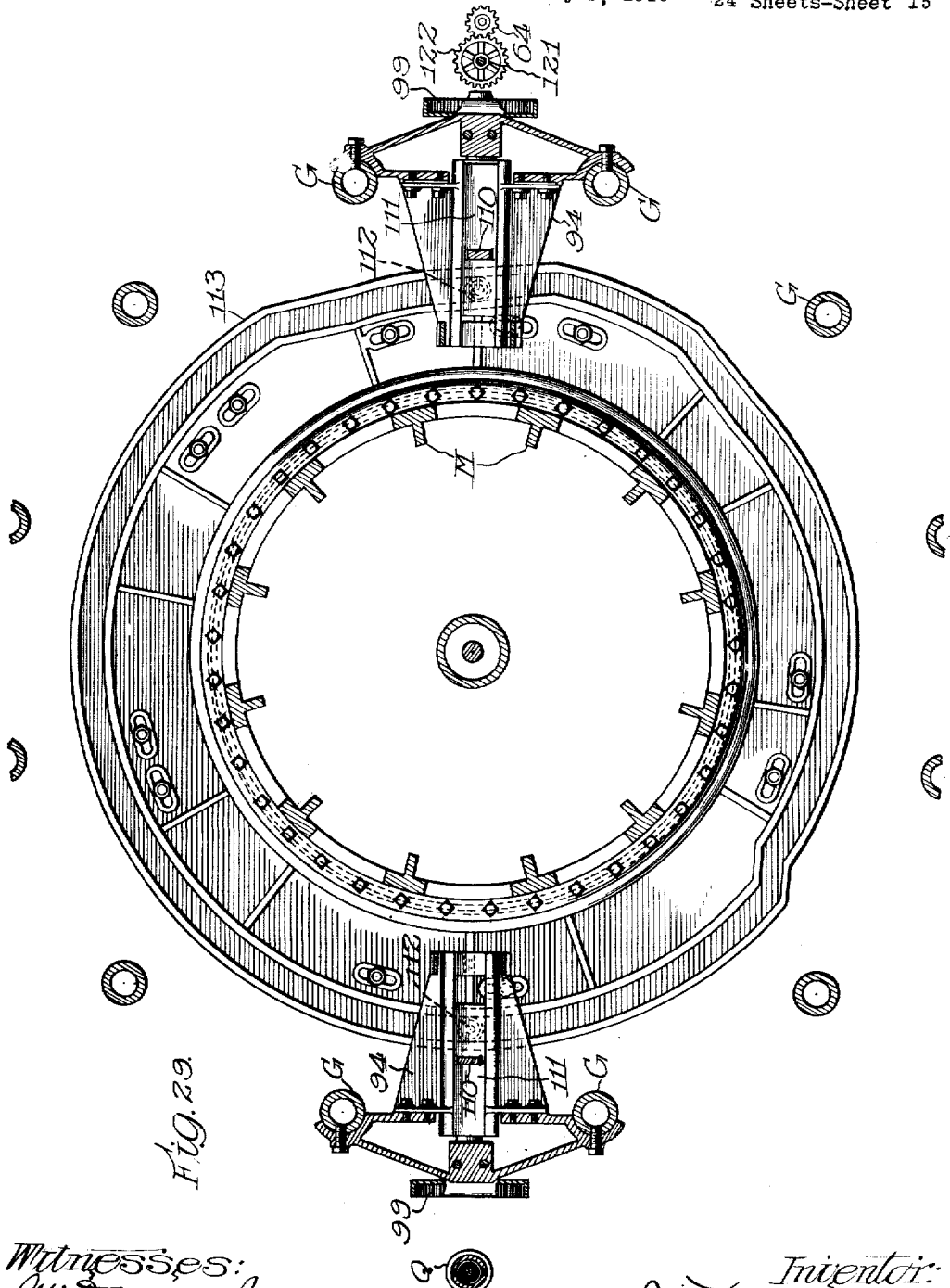

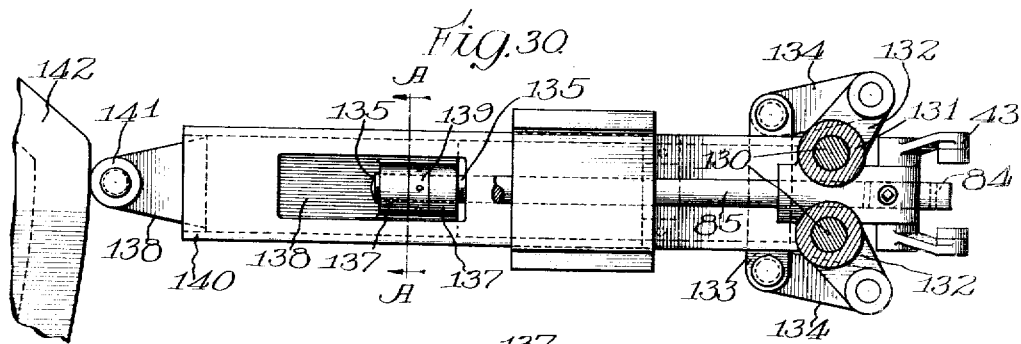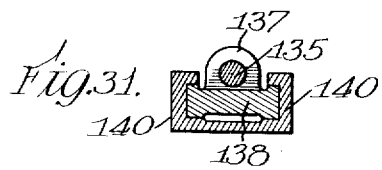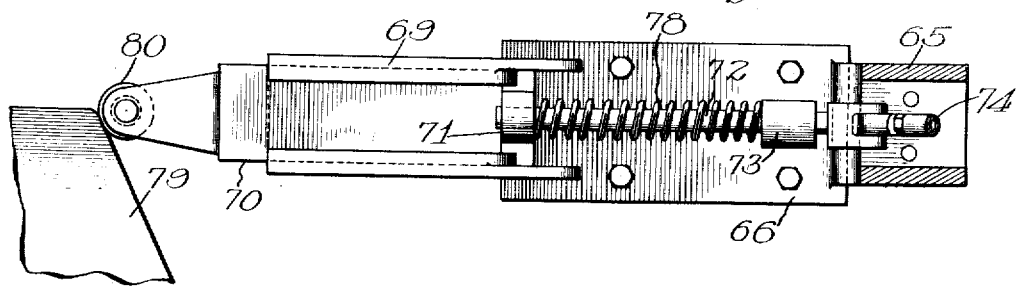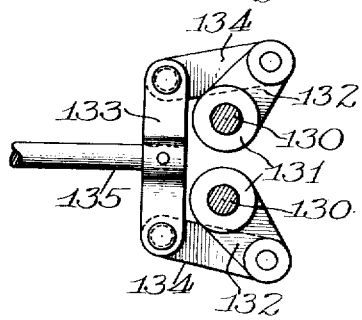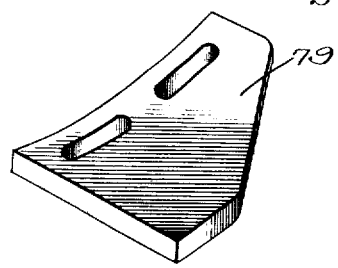

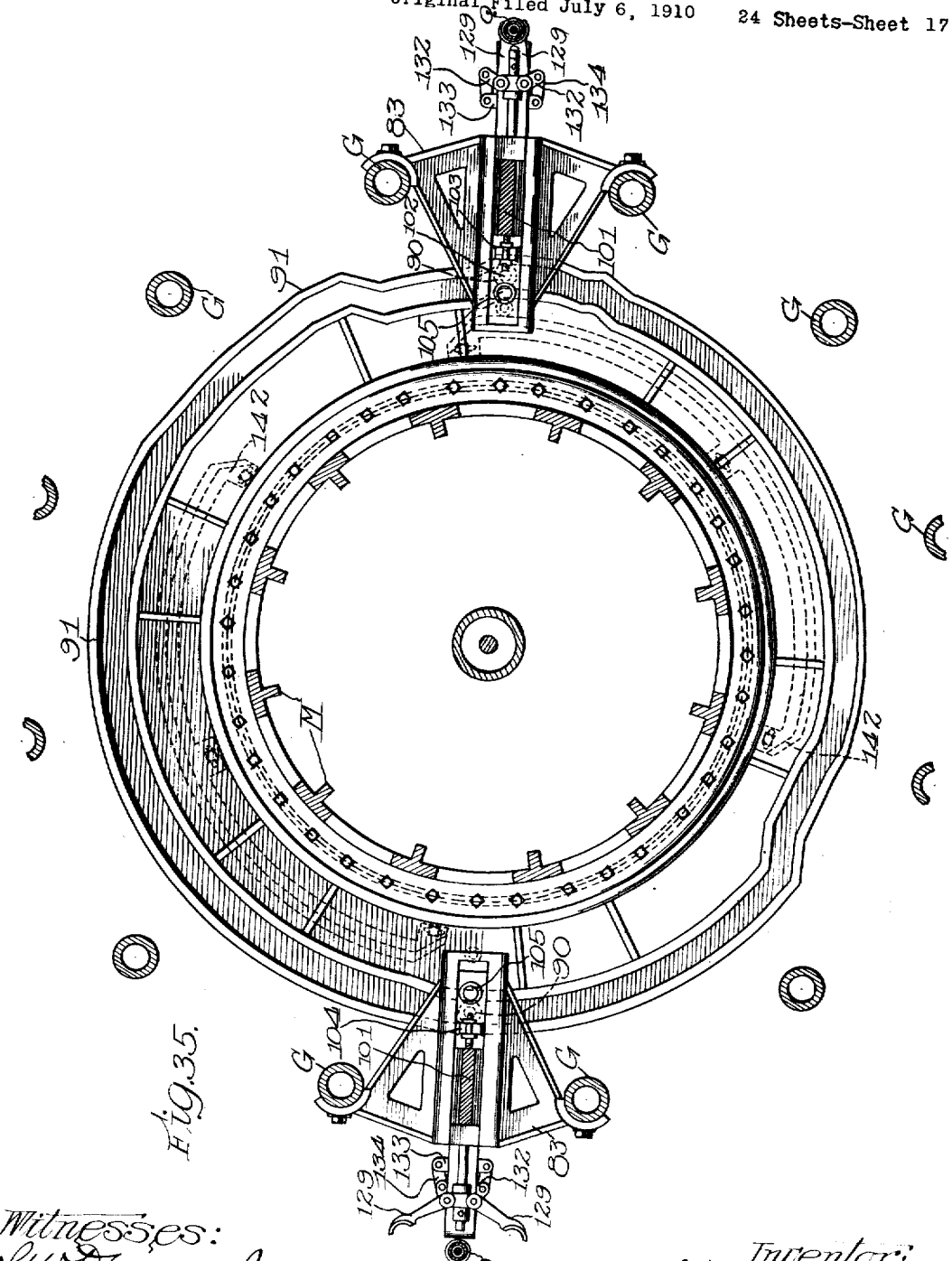

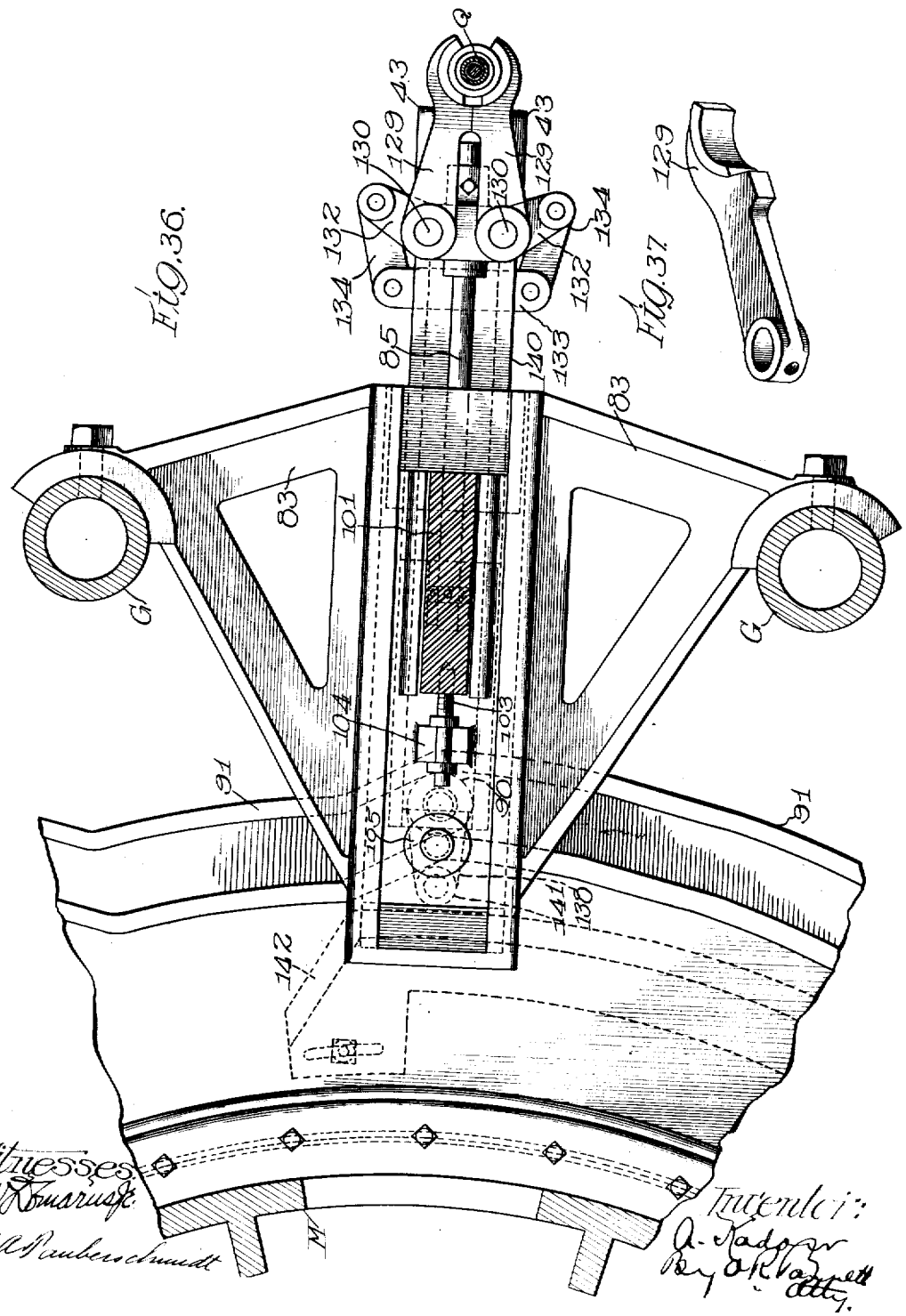

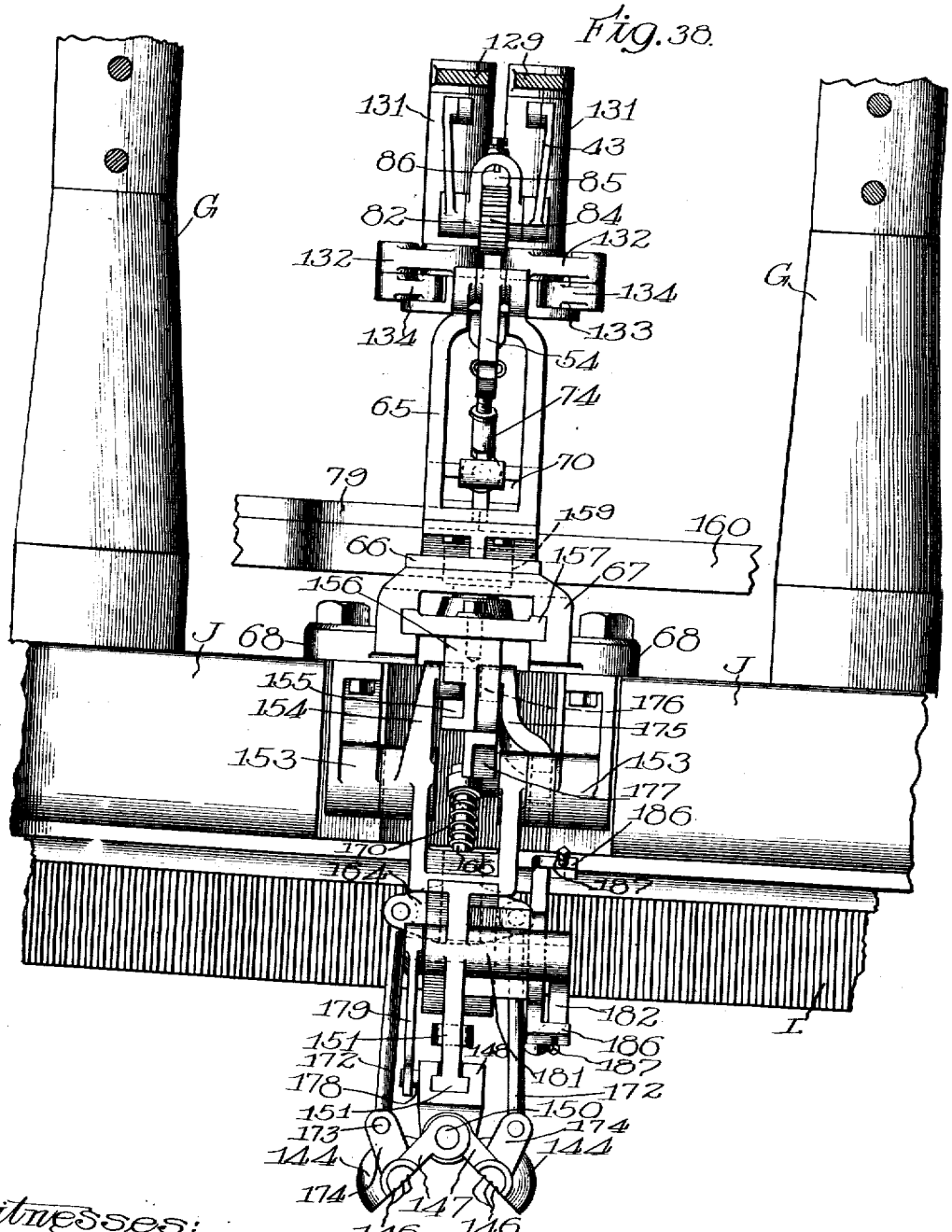

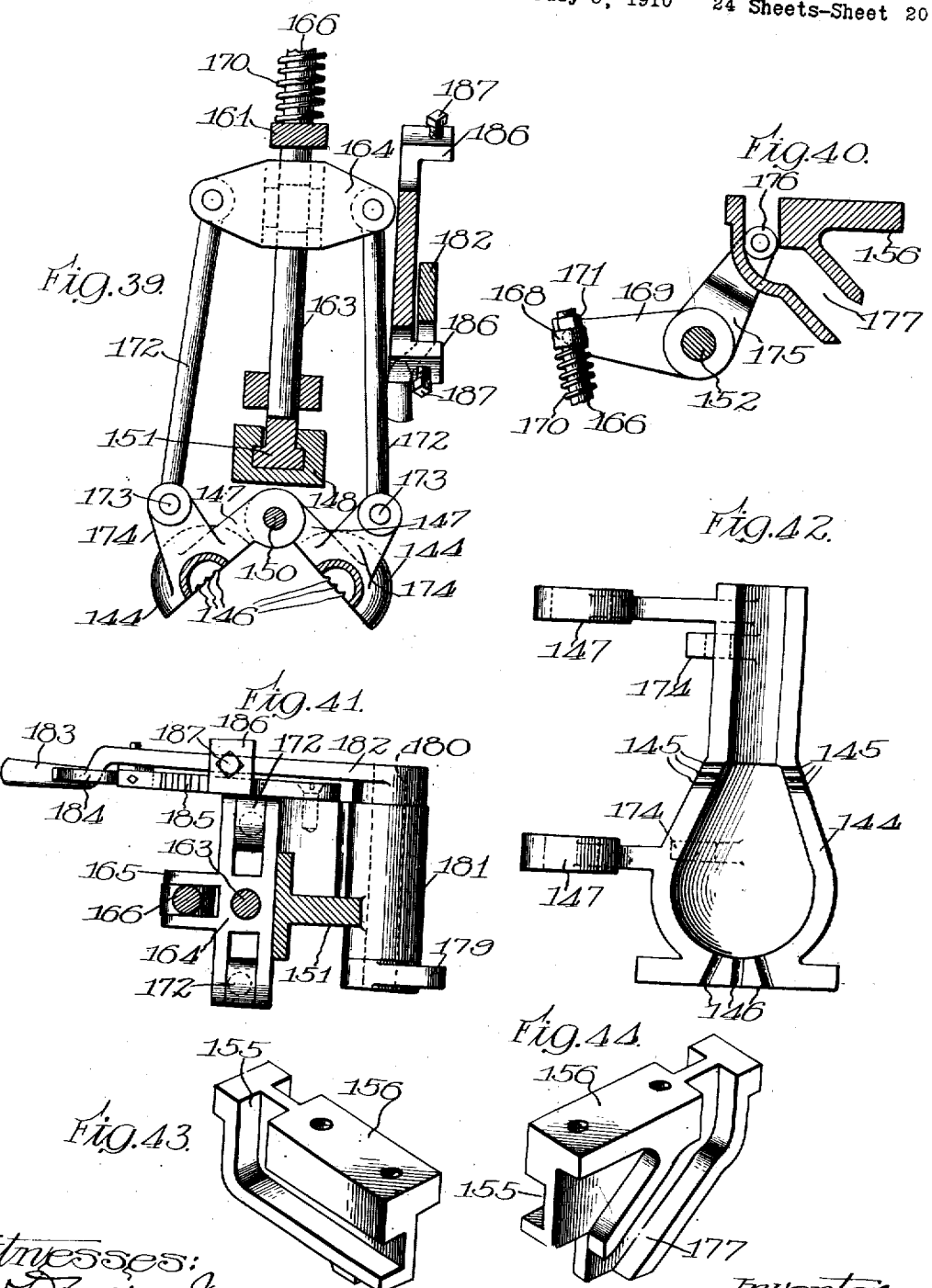

Feb. 24, 1925.
A. KADOW
1,527,559
GLASS BLOWING MECHANISM
Original Filed July 6, 1910   24 Sheets-Sheet 21
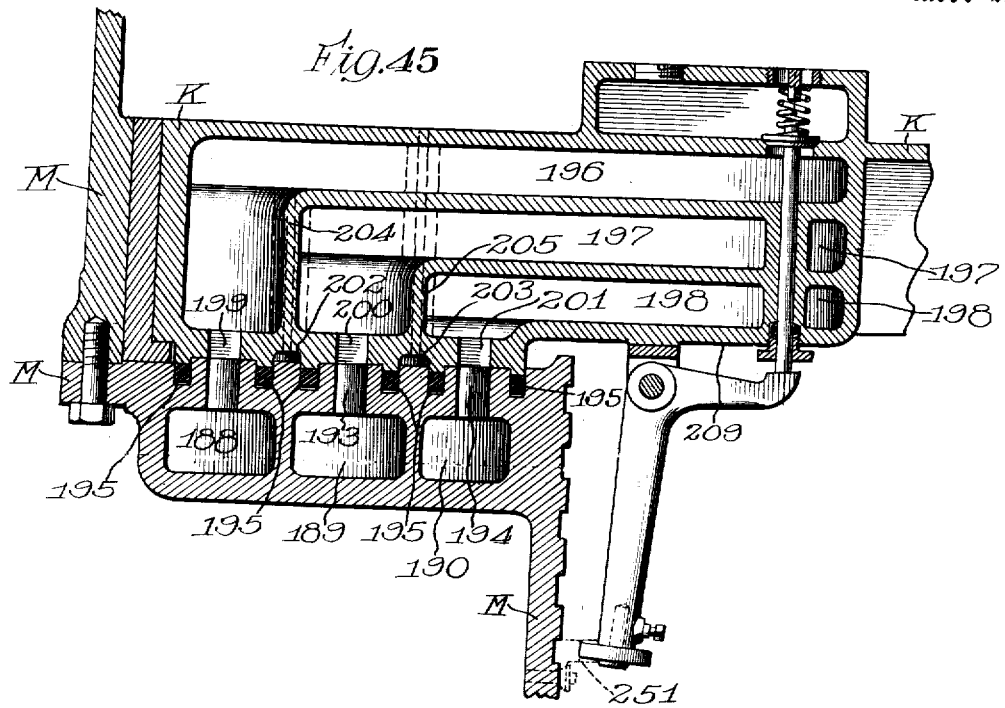

Feb. 24, 1925.

A. KADOW 1,527,559

GLASS BLOWING MECHANISM

Original Filed July 6, 1910   24 Sheets-Sheet 22

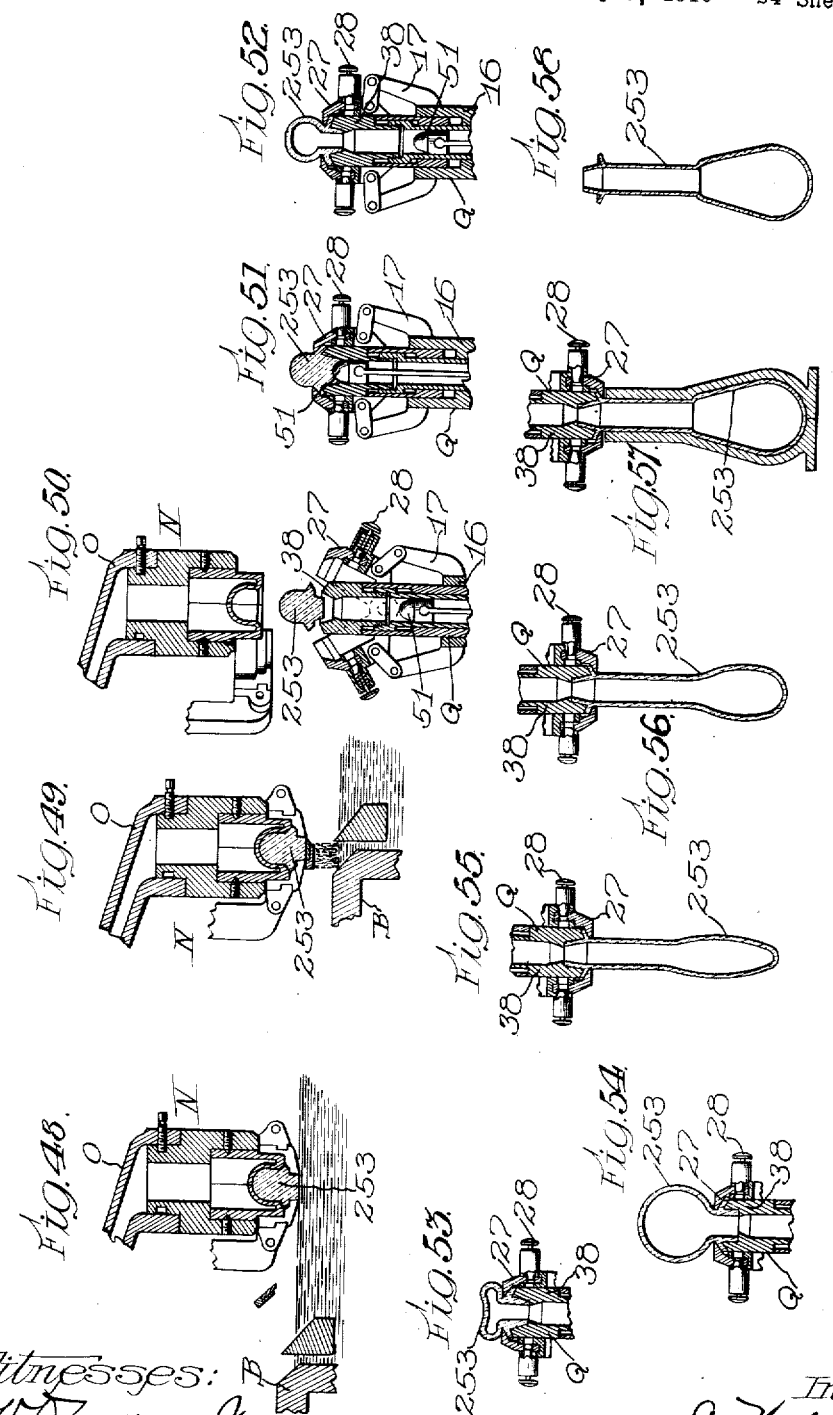

Feb. 24, 1925.

A. KADOW 1,527,559

GLASS BLOWING MECHANISM

Original Filed July 6, 1910   24 Sheets-Sheet 24

Patented Feb. 24, 1925.

1,527,559

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-BLOWING MECHANISM.

Original application filed July 6, 1910, Serial No. 570,621. Divided and this application filed May 19, 1911. Serial No. 628,226.

*To all whom it may concern:*

Be it known that I, AUGUST KADOW, a citizen of the United States, residing at Toledo, in the county of Lucas and State of Ohio, have invented certain new and useful Improvements in Glass-Blowing Mechanism, of which the following is a specification.

This application is a division of my co-pending application No. 570,621 for improvements in glass working machines filed July 6, 1910.

The present application relates more particularly to the mechanism fully described in my co-pending application under the heading "The spindle", and it is my purpose in the present application to cover the patentable features of the spindle considered as a separate machine, the spindle in combination with the air-control mechanism, and the spindle in combination with the mold mechanism and in combination with the mold mechanism and the air-control, but not intending herein to claim any combinations of the spindle with the particular gathering mechanism shown and described in my said co-pending application, such subject-matter being claimed in said original application, although I aim in the present application to cover such combinations of the spindle with gathering mechanism generically as may be properly divisible from the combinations claimed in said parent application.

A principal object of my present invention is to provide mechanism which shall receive the plastic glass, preferably a hot and plastic blank which has been gathered by other mechanism, and to blow and otherwise manipulate such mass of plastic glass into blown glassware, either partially or completely finished, in a manner in some respects analogous to hand manipulation by the skilled glass-blower.

For convenient understanding of my invention, and as a typical embodiment of it, I have shown it embodied in the mechanism disclosed in my said co-pending application and have to some extent shown in the drawings cooperating parts of the mechanism shown in my co-pending application, the invention as so embodied being especially designed and adapted for blowing electric light bulbs and for finishing the same in paste-lined molds, but while such embodiment illustrates a preferred use of my invention and a use which requires a development of the invention to a very high degree, it should be understood that my invention is by no means limited to such use, but is adapted to a wide range of use regardless of how it is supplied with the molten glass, regardless of the particular method of manipulation of the air-supply and regardless of whether the article is or is not finished in paste-molds and, indeed, with proper manipulation, my invention may doubtless be used in the manufacture of glass articles or blanks independent of molds, and is suitable for use in the manufacture of a wide range of blown glass articles.

It should be understood, therefore, that the accompanying drawings and description are merely illustrative and are not by way of limitation.

In the accompanying drawings,—

Figure 1 is a side elevation of the machine of my said application No. 570,621 showing my present invention applied thereto, and showing a convenient arrangement of the mechanisms with relation to a glass furnace.

Fig. 2 is an enlarged view, partly in section, of the mechanism shown in Fig. 1, showing in detail the principal mechanisms of my present invention.

Figure 46:
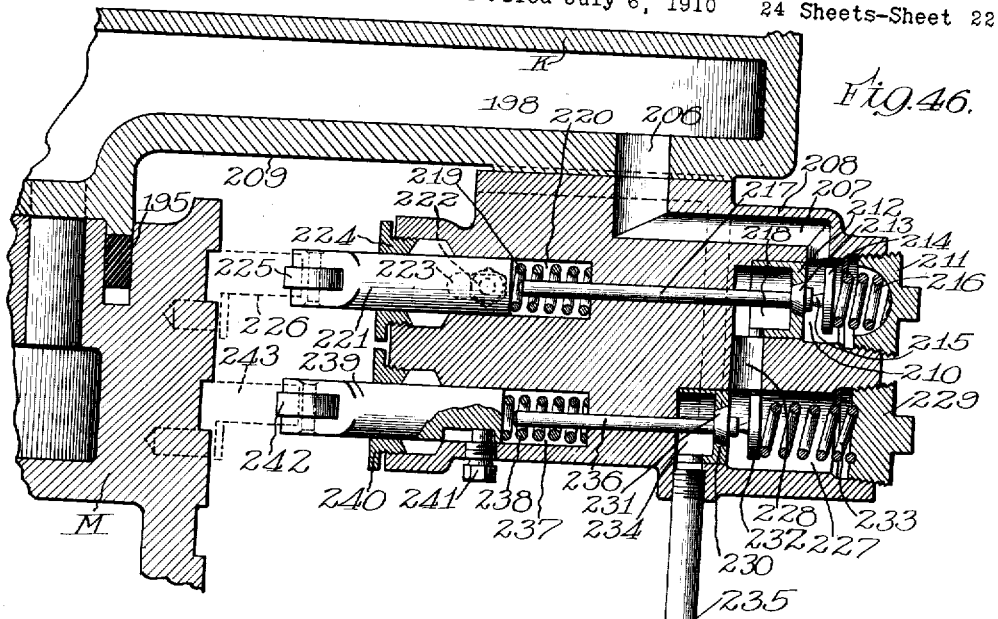

Figs. 3, 4 and 5, in the order named, constitute a continuous sectional view of the spindle, with the spindle jaws closed.

Fig. 6 is a longitudinal sectional view taken at right angles to the view shown in Fig. 3.

Figs. 7, 8, 9 and 10 constitute a continuous vertical sectional view of the spindle with the jaws open and the other parts of the spindle in corresponding positions.

Fig. 10½ is an enlarged detail.

Fig. 11 is a vertical sectional detail of the spindle.

Fig. 12 is a transverse sectional view, on the line 12—12 of Fig. 11, looking in the direction indicated by the arrows.

Fig. 13 is an enlarged vertical sectional detail of the lower end of the spindle.

Fig. 14 is an enlarged detail, partly in elevation and partly in section, of the mechanism shown in Fig. 13.

Fig. 15 is an enlarged detail of a part of the spindle mechanism.

Fig. 16 is a view looking into the glass-working end of the spindle.

Fig. 17 is a transverse sectional detail of the spindle on the line 17—17 of Fig. 6.

Fig. 18 is a perspective view of the secondary plunger tip.

Fig. 19 is a transverse sectional view of the spindle on the line 19—19 of Fig. 3, looking in the direction indicated by the arrows.

Fig. 20 is an elevation of one of the jaws or thimbles of the spindle.

Fig. 21 is a plan view of certain details relating to the spindle-swinging mechanism, certain parts of the view being in horizontal section.

Fig. 22 is a plan view of one of the spindle-rotating slides, with associated parts.

Fig. 23 is an enlarged detail, partly in elevation and partly in vertical section taken radially of the machine, of the spindle-carrying bracket.

Fig. 24 is a perspective view of the spindle lifting bell-crank lever.

Fig. 25 is an enlarged detail on the line 25—25 of Fig. 2 looking in the direction indicated by the arrows.

Fig. 26 is a transverse sectional view through the cam section of the central drum illustrating particularly, in plan view, the cam-actuating mechanism for operating the secondary plunger of the spindle, and showing also, in dotted lines, the cam-way for the finishing-mold cam.

Fig. 27 is a plan view of the spindle-swinging cam and slides.

Fig. 28 is a plan view of the spindle-rotating cam and slides.

Fig. 29 is a plan view of the spindle-raising-and-lowering cam and two of the slides actuated thereby.

Fig. 30 is a detail, partly in plan view and partly in section, of parts of the mechanism of the spindle-centering device.

Fig. 31 is a transverse sectional view, on the line A—A of Fig. 30, looking in the direction indicated by the arrows.

Fig. 32 is a plan view of the mechanism which actuates the second plunger of the spindle.

Fig. 33 is a plan view of the yoke of the spindle-centering device.

Fig. 34 is a perspective view of the cam which actuates the mechanism shown in Fig. 32.

Fig. 35 is a horizontal section through the machine shown in Fig. 1, illustrating particularly the cam-way and cam-actuated mechanism for operating the yoke or spindle-centering device which is here shown partly in plan view.

Fig. 36 is an enlarged plan view of the spindle-centering device, including the slide which operates it, and a fragment of the cam which actuates said slide.

Fig. 37 is a perspective view of one of the spindle-centering levers or jaws.

Fig. 38 is an enlarged detail showing in front elevation the finishing-mold carrier, the spindle-lifting bell-crank lever, and part of the spindle-centering device.

Fig. 39 is an enlarged detail partly in section through the finishing-mold carrier.

Fig. 40 is an enlarged detail of a part of the mechanism for opening and closing the finishing-molds.

Fig. 41 is an enlarged detail of the finishing-mold carrier, on the line 41—41 of Fig. 2, looking in the direction indicated by the arrows.

Fig. 42 is an elevation of one of the finishing-mold sections.

Fig. 43 is a perspective view of the cam block for operating the mechanism for actuating the finishing-molds.

Fig. 44 is another perspective view of the cam-block shown in Fig. 43.

Fig. 45 is a fragmentary sectional detail through the air-cam section of the central drum of the machine of Fig. 1, and through the top spider, showing the various air-chambers.

Fig. 46 is a sectional detail through the high pressure air valves and their operating mechanism.

Figure 47:
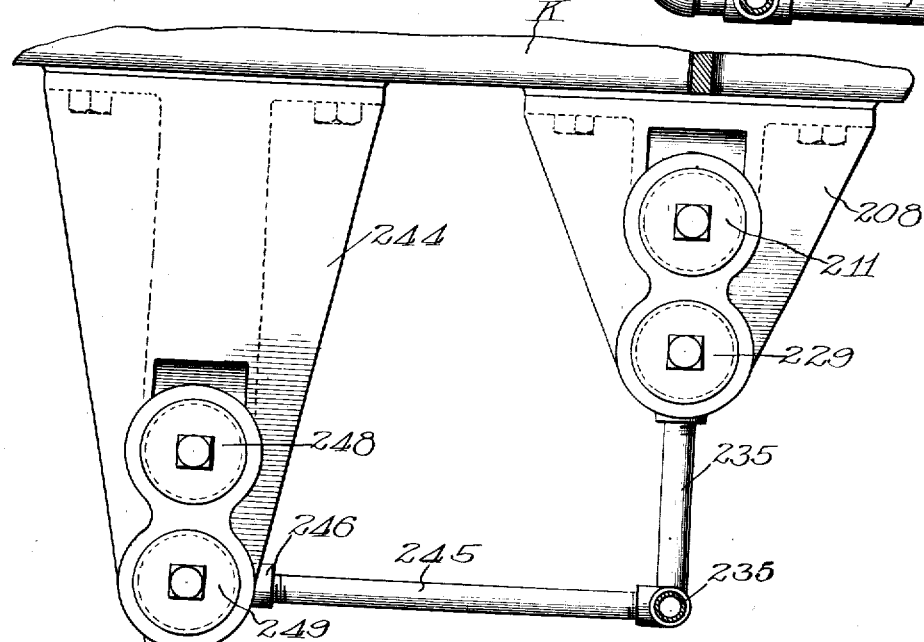

Fig. 47 is a front elevation of the high pressure air valve casing and the low pressure air valve casing.

Figs. 48 to 58, both inclusive, show the successive steps in forming an electric light bulb with my machine when used with the mechanism indicated in Fig. 1.

Figs. 59 and 60 are enlarged views of parts of the machine.

Like characters of reference indicate the same parts in the several figures of the drawings.

Referring to Fig. 1, A indicates the glass-working machine of my said application No. 570,621 equipped with two working units shown at the right and left-hand sides of the figure, respectively. In this figure I have only shown so much of the mechanism of said machine as is necessary for a ready understanding of my present invention, and I repeat that while I consider that my present invention may be utilized to the best advantage in said machine, it is by no means dependent upon such association for its utility. B indicates a glass pot or working chamber of the glass-furnace within which the usual working ring of refractory material $B^1$ floats upon the mass of molten glass. The entire machine is preferably mounted upon wheels, of which two only, C, C, are shown in the drawings. D is a motor which may furnish a convenient source of power for driving the glass-working mechanism. E is a convenient conduit for supplying air through the pipe F, to the central drum of the machine, from which it is conveyed to the hollow uprights G and through pipes H to a nozzle I, from which this body of air is discharged for conveniently cooling the glass-gathering mechanism.

The machine A comprises a bottom spider J and a top spider K, connected by the uprights G, and rotated in any convenient manner as, for example, by the peripheral gear L about a stationary central drum M. Mounted upon this stationary central drum are various cams and cam-ways which, as the spiders rotate, coact with the various mechanisms carried by the rotating frame to produce the various operations fully described in detail in said application No. 570,621 and hereafter described in detail, so far as concerns my present invention.

The top spider carries one or more glass-gathering mechanisms N comprising a ram O which at timed intervals is projected forwardly and downwardly into the molten glass to gather the required quantity of metal which constitutes the blank to be worked. P is a cam or cam-plate which rotates about the axis of the central drum, preferably at a speed higher than that of the rotating spiders. The cam-plate P, by means of suitable connections, is the preferred mechanism for periodically actuating the glass-gathering mechanism. Carried on the rotating framework around the central drum are one or more sets of glass-working mechanisms involving my present invention. In the installation illustrated, a complete machine would include six complete units or glass-working mechanisms, but for convenient illustration I have in Figure 1 only shown two sets of units, that on the right being shown in the position where it will shortly receive the blank to be worked, and that on the left being shown in the position where the completed article will be shortly released. Each of these glass-working mechanisms comprises a unit or set of mechanisms which I conveniently call the spindle, indicated on Fig. 1 as an entirety as Q, air control devices, indicated on Fig. 1 as an entirety as R, and finishing-mold mechanism, indicated on Fig. 1 as an entirely as S.

*The spindle.*

This mechanism is shown particularly in Figs. 1 to 20 and 23, while details of the spindle operating mechanism are shown in Figs. 21, 22, and 25 to 38, inclusive.

As to the spindle itself, attention is particularly called to Figs. 2 and 3 to 10, inclusive, which should be read together. Figs. 3, 4 and 5 constitute together one continuous sectional view of the spindle with its parts in one position, and Figs. 7, 8, 9 and 10 constitute a continuous sectional view of the spindle with its parts in another position. The function of the gathering mechanism, which per se constitutes no part of the present invention, is merely to gather the blank from the furnace and to deliver it to the blow-pipe in the spindle and preferably so that its threaded end will be received by the blow-pipe in the spindle.

The functions of the spindle when utilized in the various respects here described is to take the blank so gathered, partially blow it, and swing it out, so as to give it a shape which shall preferably approximate the shape of the finished article, distribute the metal evenly through the walls of the blank and, finally, rotate the blank in a paste-lined mold and do such further blowing of the blank as shall cause the blank to take the shape of the mold and as shall keep the blank from collapsing until it has sufficiently set to hold its desired shape or finished form, and to then release and deliver the blown article, but of course my invention may be practiced so as to attain only some of these results, or so as to attain them in a less degree.

The spindle is built upon the spindle shell 1 (Figs. 2 and 3). About midway of its length the spindle shell has screwed onto it a collar 2 (Figs. 2 and 4) provided with flanges 3 and 4, and with a slotted extension 5, which is tapered at its outer end to fit into a lock-nut 6. The spindle is supported on rollers 7 carried on the ends of the arms of a bell-crank lever 8 (Figs. 2 and 23), said arms constituting a "yoke" (Fig. 24). Above and below the bell-crank lever 8, the spindle shell 1 is journaled within sleeves or bearings 9 and 10 on the ends of the arms of a bracket 11 (Figs. 2 and 23).

The sleeve or spindle extension 12 is fitted over the upper end of the spindle shell 1 (Figs. 3 and 7) and secured thereto by the screws or studs 13, which are threaded into the extension or sleeve 12 and extend inwardly through and beyond the spindle shell 1 (Fig. 6). Screwed into the upper end of the sleeve 12 are the shoulder studs or hinge pins 14 upon which the jaws 15 are pivoted or hinged (Figs. 6 and 7). Fitted over the upper end of the spindle shell 1 and the lower end of the extension or sleeve 12, is the sleeve 16, the upper end of which carries the bracket arms 17 connected by links with the jaws 15, respectively, and is slotted to receive the outer ends of the studs 13. Near its lower end the sleeve 16 is slotted at 18 to receive the screws 19 which extend inwardly through slots 20 in the spindle shell 1, and are screwed into the middle section 21 of the main plunger (Figs. 6 and 15). The spindle shell 1 is reduced in diameter at its upper end within the shell or sleeve 16 to provide a shoulder 24 and a spring-chamber within the shell or sleeve 16 to receive the spring 25, which is seated at one end against the shoulder 24 on the spindle shell 1, and at the other end against an inwardly extending flange or shoulder 26 on the sleeve 16. The expansion of this spring tends to move the sleeve 16 and the spindle shell 1, with relation to each other, in such direction that the hinge pins 14 carried by the spindle-shell extension 12, and the bracket arms 17 carried by the shell 16 will approach each other, thereby holding the jaws 15 closed (Fig. 3).

In Figs. 2, 3 and 7 the jaws 15 on the spindle are shown provided as a matter of convenience with removable ends or thimbles 27. These thimbles are removably held in position by button-headed pins 28 provided with conical ends 29 and pressed by springs 30 into conical seats in the thimbles 27.

Mounted within the spindle shell 1 is a plunger, shown in the drawings as made in three sections,—the middle section 21, the upper section 22, and the lower section 23. The middle section 21, and the lower section 23, are screwed together (Fig. 4) as a matter of convenience in machining and assembling. At 31 (Fig. 4) the plunger section 21 is reduced to form a chamber for the spring 32 which surrounds the plunger section 21, is seated at its lower end on a washer 33, which rests on an internal shoulder on the spindle shell 1 at the bottom of the chamber 31, and is seated at its upper end against a shoulder 34 on the plunger section 21. The tendency of this spring is to force the plunger outwardly with relation to the spindle shell. The upper end of the middle plunger section 21 is provided with a nipple 35, preferably of rubber or Babbitt metal. The lower end of the upper plunger section 22 is provided with a conical tip 36 adapted to be seated in the nipple 35 to make an airtight joint therewith. About midway of its length the plunger section 22 is provided with guideways 37 to receive the extreme inner ends of the screws 13, the lower ends of these guideways constituting stops engaging screws 13 to limit the outward longitudinal movement of the plunger section 22 with relation to the spindle shell 1. (Fig. 6.)

Upon the upper end of the plunger section 22 is mounted the main plunger tip 38 having a central opening or seat converging inwardly and downwardly. Slidingly mounted upon the exterior of the spindle shell 1 is a collar 39, which is secured to the plunger section 21 by screws 40 which extend through slots 41 in the spindle shell 1 (Figs. 2, 4, 11 and 12).

In the operation of the machine, when the spindle is at its lowermost position, that is, in the position shown in Fig. 1 left hand side, rollers 42 on the ends of the arms of a yoke 43 engage the collar 39, as shown in dotted lines at the top of Fig. 4, and move it in the direction indicated by the arrows in Fig. 4, thereby moving the plunger section 21 in a direction to compress the spring 32, and by the continued travel of the plunger bring the screws or pins 19 in contact with the bottoms of the slots 18 in the sleeve 16 (Fig. 11) whereupon the continued travel of the plunger moves the sleeve 16, carrying with it the arms 17 and pulling open the jaws 15. During this operation the plunger section 22 remains in position at the lower end of the reversed spindle, being held there by gravity, while the extreme ends of the screws or studs 13 engaging the bottoms of the slots or ways 37 keep the plunger section 22 from dropping out of the spindle.

On the outer end of the lower plunger section 23 is mounted a sleeve or shell 44 provided with a flange 45. A groove is milled at 46 in the outer end of the plunger section 23 (Fig. 13) and a pin 47 is driven through the shell or sleeve 44 so as to loosely engage the groove 46. In this manner the plunger section 23 is rotatably connected with the shell 44 but may not be withdrawn therefrom.

When the spindle is in upright position, (Fig. 2) and about to receive the blank from the gathering mechanism, the arms of the yoke 43 engage the flange 45, as shown in dotted lines in Fig. 5, and move the shell 44 in the direction indicated by the arrows in Fig. 5. When this occurs, the jaws 15 are opened precisely the same as when the yoke 43 engages the collar 39, but, owing to the fact that the spindle is now in the position shown in Fig. 2, the downward movement of the plunger permits the plunger section 22 to drop by gravity until the shoulder near the bottom of the main plunger tip 38 rests upon the upper end of the spindle shell extension 12 (Fig. 7). This occurs before the screws 19 engage the bottoms of the slots 18 on the shell 16, and consequently the upper plunger section 22 and the plunger tip 38 carried by it drop down below the end of the spindle before the jaws 15 begin to open. The continued downward travel of the yoke 43 pulling on the flange 45 pulls the plunger section 21 downwardly until the jaws 15 are opened and the parts are in the position shown in Fig. 7.

Centrally arranged within the spindle is the second plunger or rod 48 secured at one extreme end to the cap 49 and to the lock nut 50 (Fig. 5) and carrying at the other end the secondary plunger tip 51. At that end of the rod 48, farthest away from the tip 51, is the cap 49 provided with a flange 52 and surrounded by a spring 53, which is seated at one end upon the flange 52 and at the other end upon the bottom of the shell or sleeve 44. The expansion of this spring pulls the rod 48 downwardly or outwardly from the spindle, whereby the secondary tip 51 is drawn to the position with relation to the plunger tip 38 shown in Fig. 7, so as to open the central passage through the plunger tip 38, but at the instant when it is desired to force the secondary plunger tip 51 into the plastic blank, the cam operated lever 54 (shown in dotted lines in Fig. 5) forces the rod 48 upwardly, whereby the secondary plunger tip 51 is seated to close the opening through the main plunger tip 38 and is brought to the position shown in Figs. 3 and 6. (See also Fig. 1.)

The functions of the auxiliary or secondary plunger tip 51 are various. By squeezing the neck of the blank between the main plunger tip 38 and thimbles 27, it insures a sufficiently air-tight seal between the blank and the spindle so that there will be no objectionable leakage of air and the controlled quantity automatically admitted to the spindle, as hereinafter described, will therefore operate effectively upon the blank. Forcing the relatively cold auxiliary plunger tip 51 into the neck of the blank, the exterior of which is seated against the relatively cold main plunger tip 38, tends to stiffen the neck of the blank so that the blank will be more securely held by the spindle during the subsequent operations of the spindle, and the air admitted to the spindle operates more effectively to elongate the blank; and by thus forming a recess or air-chamber in the blank the subsequently admitted air pressure is more effectively applied.

The shell 44 constitutes an air-chamber closed at one end by a stuffing box 55, which stuffing box is provided with slots or ways 56 to receive the pins 57 on the cap 49, which construction serves to limit the movement of the rod 48 outwardly from the spindle. (Fig. 13.) At its other end, the shell 44 is provided with a stuffing box 58 (Fig. 14), surrounding the plunger section 23. Air is conducted to the bottom of the shell 44 by an air-pipe 59 having a flexible connection, such as the hose 60, with a source of compressed air (Figs. 5 and 13). An air passage is provided around the rod 48 from the bottom of the shell 44 to and through the main plunger tip 38. 61 is an arm bolted to the sleeve 10 and provided with a pin 62 which extends into a slot or groove 63 in the wall of the shell 44, said slot, however, not extending through the wall of the shell. By virtue of this arrangement, while the plunger carrying the shell 44 may be moved longitudinally with relation to the bracket arm or sleeve 10, and may be rotated within the shell 44, the shell 44 is held against rotation by its engagement with the arm 61 and pin 62, thereby protecting the air-pipe 59 and hose 60.

At 64 (Fig. 5) the spindle shell 1 is provided or formed with a pinion which, by meshing with gears to be hereafter described, serves to rotate the spindle shell 1 within the bearings or journals afforded by the bracket sleeves 9 and 10 on the arms of the bracket 11, and also within the jaws or yoke of the bell-crank lever 8, thereby at the same time rotating all of the parts mounted upon and connected with the spindle shell 1, except the shell or air-chamber 44 which is held against rotation in the manner previously described.

The lever 54 which actuates the second plunger or rod 48 (Figs. 2 and 5) is shown with its operating mechanisms in Fig. 2 and elsewhere, but is most clearly shown in Figs. 2, 32 and 59. This lever is pivotally mounted on the bracket arms 65 at one end of a plate 66 which is bolted to a box 67 which in turn is rigidly secured to the lower spider J. The rear of the plate 66 is provided with slide-ways 69 in which a slide 70 moves radially in the machine (Fig. 32). The slide 70 is provided with a lug 71 to which is secured a rod 72 which slides through a lug 73 on the plate 66 and connects with the lower end of a link 74, which is pivoted at its upper end to the lever 54. A spring 78 surrounds the rod 72 between the lugs 71 and 73 and normally holds the parts in the position shown in Fig. 32.

As a matter of safety, to prevent buckling of the mechanism, the link 74 comprises a stem 75 which slides within a sleeve 76 and is provided with transverse pins slipping in slots in the sleeve 76, a spring 77 holding it in its normal position.

Secured to the cam section of the central drum is a cam-plate 79 interposed in the path of the inner end of the slide 70, as the rotating framework travels around or past the cam-section. The slide 70 carries a roller 80. As the plate 66 rotates with the lower spider, the roller 80 engages the inclined face of the cam-plate 79 so that the slide 70 and the rod 72 carried by it are moved outwardly, thereby compressing the spring 78 and swinging the lever 54 to the position shown in dotted lines at the bottom of Fig. 5. This is further illustrated in the plan view shown in Fig. 26.

The yoke 43, which operates to open and close the jaws carried by the spindle, is shown in Fig. 2 and the mechanism which operates it is shown in enlarged detail in Figs. 22, 38, and elsewhere. The yoke 43 is keyed to a horizontal pivot 81 which rotatably extends through a lug 82 (Fig. 38) on a bracket 83, which is removably secured to two of the uprights G connecting the upper and lower spiders (Figs. 1 and 2).

Keyed to this same pivot 81 is a pinion 84 (Fig. 38). A rack bar 85 is guided through the lug 82 and in mesh with the pinion 84 and in sliding engagement with a key 86 to keep the rack bar from turning. This rack bar is also guided at 87 (Fig. 59) in the rear part of the bracket 83, and is screwed into one end of a slide plate 88 which runs in slide-ways 89 on the underside of the rear end of the bracket 83. The slide plate 88 carries a roller 90 which travels in a camway or groove on a cam-plate 91, which cam-plate is rigidly secured to the cam section of the central drum. It will be seen that as the cam-plate 91 moves the slide-plate 88, the rack bar 85 engaging the pinion 84 will rock the arms of the yoke 43 upwardly or downwardly, as the case may be.

When the spindle is in upright position, the downward movement of the yoke 43 will cause the yoke-arms to engage the flange 45 on the spindle (Figs. 2 and 5). When the spindle is swung downwardly, as shown at the left-hand of Fig. 1, the upward movement of the arms of the yoke 43 will cause them to engage the collar 39 on the spindle (Fig. 4). The operation in either event results in opening the jaws at the end of the spindle.

The spindle swinging mechanism.

The swinging or rotation of the spindle about a horizontal axis is accomplished by the following mechanism (see particularly Figs. 2 and 25):

The bracket 11 is provided with a hub or hollow shaft 92 (Figs. 2 and 23) extending through a sleeve or journal 93, which is formed or cast on a bracket 94 (Fig. 25). The bracket 94 is bolted or otherwise secured to two of the uprights or hollow posts G, G.

Secured to the inner end of the hollow shaft or hub 92 is a collar 95, which engages the inner end of the journal 93 on the bracket 94 and holds the spindle bracket 11 from displacement outwardly. Keyed on the hub 92 of the bracket 11 at the outer end or face of the bracket 94 is a pinion 96 (Figs. 2 and 23), the casting or bracket 94 being cored out to form a housing around the major part of the periphery of the pinion 96 (Fig. 25). Journaled within a bracket 97, secured to and depending from the bracket 94, is a shaft 98 having keyed to its outer end a gear 99 and to its inner end a spirally toothed pinion 100 (Fig. 2). The toothed pinion 100 is in mesh with the diagonally arranged teeth on a rack bar 101 secured to a slide-plate 102 and adjustably connected therewith by means of a screw 103 which is screwed into the slide-plate 102 and engages a lug 104. The slide-plate 102 is provided with a roller 105 running in a groove or cam-way in the cam-plate 106, which is secured to the relatively stationary cam section of the central drum or column of the machine.

As the rotating framework of the machine travels around or past the central drum or column, the roller 105, following the contour of the cam-way in the cam-plate 106, will cause a reciprocation of the slide-plate 102. Thereupon the rack bar 101, engaging the pinion 100, will rotate the pinion 100 and the shaft 98 to which the pinion is keyed, thereby rotating the gear wheel 99, which is keyed to the opposite end of the shaft 98 and the gear wheel 99, meshing with the pinion 96, will consequently rotate the bracket 11 upon its horizontal axis, thereby swinging the spindle, carried by the bracket 11, upon the horizontal axis of the bracket 11.

The spindle raising and lowering mechanism.

Slidable longitudinally within the shaft 92 of the bracket 11 is a sleeve 107 (Figs. 2 and 23). This sleeve is provided at its inner end with collars 108 and 109, engaging opposite sides of a lug or support 110 on the slide-plate 111 (Fig. 2). The slide-plate 111 is provided with a roller 112 engaging a cam-way in the cam-plate 113, which is rigidly secured to the cam section of the central drum or column. This is the device which rocks the bell-crank 8, shown in perspective in Fig. 24, by which bell-crank the spindle is supported and is bodily raised or lowered in the direction of its length. The outer end of the sleeve 107 is provided with notches which engage the rollers 114 on two of the arms of the bell-crank 8, said bell crank being mounted on the pivot 115 in the bracket 11 (Fig. 23).

The spindle rotating device.

Rotatably mounted within the sleeve 107 is a shaft 116 (Fig. 2) provided on its innermost end with a spirally toothed pinion 117 and supported in a journal or bearing 118 on the bracket 94. On its opposite end the shaft 116 carries a bevel gear 119 which meshes with a bevel gear 120, shown in dotted lines in Fig. 23. The bevel gear 120 is keyed to one end of a vertical shaft 121 which is journaled in one of the arms of the bracket 11 (Figs. 2 and 23.) The opposite end of the shaft 121 carries a gear wheel 122 within a housing 123. The gear wheel 122 meshes with the pinion 64 on the spindle. The spiral gear 117 (Fig. 2) on the shaft 116 meshes with a rack bar 124 carried by a slide-plate 125 which is provided with a roller 126 engaging a cam-way or groove in the cam-plate 127, which cam-plate is secured to the cam section of the central drum or column.

As the engagement of the cam-way or groove on the cam-plate 127 with the roller 126, during the movement of the traveling or rotating frame past or around the central column, causes the slide-plate 125 to reciprocate in the slide-ways 128, the rack-bar 124 rotates the spiral gear 117, thereby causing the shaft 116 to rotate and thence, through the train of gears 119, 120, 122 and 64, the spindle will be rotated upon its longitudinal axis.

The spindle centering device.

Where my invention is to be used to what I now conceive to be the best advantage, it is essential that in receiving the blank from the gathering mechanism the spindle shall be brought and held in axial alinement with the blank-delivering part of the gathering mechanism, and it is also essential that when the operations of the spindle have developed the blank to the stage where it is ready for insertion in the finishing molds, where such molds are used, that the spindle shall be brought and held in axial alinement with the finishing molds. To accomplish this automatic and certain axial alinement of the spindle, I provide what I call centering device (Figs. 2, 25, 30, 33, 35 and 36).

This device consists of a pair of centering arms 129, each arm being keyed to a separate vertical shaft 130. The shafts 130 are vertically and rotatably mounted in vertical bearings 131 on the bracket 83, which is bolted to two of the upright posts G, which are mounted on and travel with the upper and lower spiders. Keyed to the lower ends of the vertical shafts 130 are lever-arms 132 (Figs. 2, 30, 36 and 38). These lever arms 132 are respectively connected with a cross-head 133 by means of links 134. This arrangement of lever arms, links and cross-heads I have for convenience termed the "yoke" (Fig. 33).

The cross-head 133 is secured to a rod 135 which reciprocates through a lug 136 bolted to the underside of the bracket 83 (Fig. 2). The inner end of this rod 135 passes through lugs 137 on the slide plate 138 and is screwed through a nut 139 which is rotatably mounted between the lugs 137 (Figs. 2, 30, 31 and 32). The slide-plate 138 reciprocates in slide-ways 140 carried by the bracket 83 and is provided at its inner end with a roller 141 arranged to successively engage cams 142 secured to the cam section of the central drum (Figs. 2 and 35). Interposed between the forward lug 137 on the slide-plate 138 and the lug 136 on the bracket 83, is a spring 143 which surrounds the rod 135 and which normally forces the slide-plate 138 backwardly or towards the center of the machine shown in Fig. 1, so as to hold the centering jaws open.

The operation of this centering device is such that as the rotation or travel of the spiders carries the roller 141 in contact with either of the cams 142, the slide 138 is moved outwardly, thereby compressing the spring 143 and carrying the stem or rod 135, cross-head 133, and links 134 forwardly, thereby rocking the lever-arms 132, shafts 130, and the centering arms 129, and bringing the centering arms to the position shown in Fig. 36 and at the right-hand side of Fig. 35, in which position they are clamped around the spindle (see also Fig. 2). In this position of the mechanism the spindle is rotatably held in axial alinement with the position occupied by the finishing mold when it rises to receive the blank (as shown at the left-hand side of Fig. 1), or the spindle is held in axial alinement with the blank delivering mechanism of the gathering device, as indicated at the right-hand side of Fig. 1 and in Fig. 2.

The finishing mold.

This mechanism will be most readily understood from Figs. 1, 2, and 38 to 44, inclusive.

In the particular machine shown in the drawings I have illustrated the use of my invention in connection with a paste-mold consisting of two half molds 144 (Fig. 42), provided with vents 145 and 146 and shown in the illustrations as adapted for the making of electric light bulbs. Each mold section is provided with perforated lugs or hinges 147. A bracket 148 (Fig. 2) is provided with a shoulder 149 into which at right angles is secured a pin 150. The hinges or perforated lugs on the mold sections are hingingly mounted upon the pins 150, preferably the openings in the hinges are tapered from the top downwardly so that an externally tapered bushing may be slipped over the pin 150, and, in that event, the hinges of the mold sections 144 will be slipped over and will rotate upon such tapered bushing. This, however, is a familiar structure forming no part of my present invention. The bracket 148 is mounted on the mold carrier 151 in such manner as to be slidably adjustable thereon longitudinally of the bracket 148 (Fig. 2). The mold carrier 151 is in turn mounted on bearing studs 152 (Fig. 2) secured to hangers 153 which are bolted to the flanges 68 of the box 67 (Fig. 38). The box 67 is secured to the lower spider J. Upon the mold carrier 151 is an arm 154 provided with a roller arranged to run in a cam-groove 155 formed in a cam-block 156 which is secured to a slide-plate 157 (Figs. 2 and 38). The slide-plate 157 reciprocates in slide-ways 158 formed in the box 67, and is provided with a roller 159 engaging a groove or cam-way in a cam-plate 160, which is secured to the cam-section of the central drum. The cooperation of the roller 159 and cam-plate 160 results in reciprocating the slide-plate 157, and the cooperation between the roller on the arm 154 and the cam groove 155 on the block 156 are such that as the slide-plate 157 is drawn inwardly the arm 154 is rocked and in turn rocks the mold carrier 151 so as to bring the mold carrier 151 and the parts carried thereby into a position to receive the blank that is illustrated in the drawings with the mold carrier horizontal and the molds vertical.

Secured between lugs 161 and 162 on the mold carrier 151 is a rod 163 upon which is slidably mounted a cross-head 164 (Figs. 2, 39 and 41). Pivoted to a lug 165 on this cross-head is a rod 166 provided near one end with a collar 167, and extending at the other end through a lug 168 on the lever arm 169 (Figs. 2, 39 and 40). A spring 170 surrounds the rod 166 and is seated at opposite ends against the collar 167 and lug 168, respectively. A nut 171 on one end of the rod 166 engages the lug 168 on the arm 169.

Two rods or links 172 are pivoted respectively to the opposite sides of the crosshead 164. At their opposite ends these rods are pivotally connected with hinge pins 173 secured in lugs 174 on the mold sections 144, respectively (Figs. 2, 39 and 42). The hinge pins 173 and links 172 are also slidable, with relation to each other, lengthwise of the hinge pins 173.

The arm 169 is one arm of a bell-crank which is pivotally mounted upon one of the studs 152 (Fig. 40). The opposite arm 175 of this bell-crank is provided with a roller 176 running in a way or groove 177 in the cam-block 156. Consequently the reciprocation of the slide-plate 157, in addition to operating the arm 154 to swing the carrier 151 on its horizontal axis 152, also moves the bell-crank arms 175 and 169 and thereby compresses the spring 170, against the collar 167 so as to force the rod 166 and the cross-head 164 forwardly, thereby, through the links 172 closing the mold sections 144.

The purpose of interposing the spring 170 is mainly a matter of safety in case a piece of hardened glass or other non-yielding obstruction should interfere with the closing of the mold sections.

Upon the reverse movement of the parts the resulting rocking of the lever arm 169 carries the lug 168 against the nut 171 and positively draws the rod 166 and the crosshead 164 backwardly, thereby opening the mold sections.

The contour and relations between the cam grooves 177 and 155 in the cam block 156 (Figs. 43 and 44) are such that the vertical parts of these cam-ways and the horizontal parts immediately adjoining the vertical parts are parallel with each other, but while the horizontal part of the cam-way 155 extends to the end of the cam-block 156, the cam-way 177 extends parallel with the horizontal part of the cam-way 155 for only a very short distance and then changes its direction and extends downwardly forward (Figs. 2 and 44).

The result of this arrangement is that when the rearward movement of the slide-plate 157 initially rocks the lever-arm 154, so as to bring the mold carrier 151 to a horizontal position, bringing the molds 144 to a vertical position, the molds will remain open during a short part of the rearward travel of the slide-plate 157, but as the slide-plate 157 continues its rearward travel, without further moving the arm 154, the arm 175 of the bell-crank will be forced downwardly by the cam-way 177, thereby rocking the bell-crank, forcing the crosshead 164, and closing the mold sections 144. By virtue of this arrangement the molds will be brought to a vertical position while open, will be closed upon the blank at the desired moment, and will be opened horizontally to release the blank before being dipped downwardly into the water-tank X (Fig. 2).

For the purpose of adjusting the vertical position of the mold the bracket 148 is longitudinally slidable upon the mold carrier 151, as heretofore noted, and is provided with a pin 178 engaging the slotted end of one arm 179 of a bell-crank lever, the shaft 180 of which rotates in a bearing 181 on the mold-carrier 151, and the opposite arm of which 182 is provided with a handle 183 and a spring lock dog 184 which engages the teeth of a segmental rack 185. The lugs 186 and set-screws 187 serve as stops to limit the movement of the arm 182 (Figs, 2, 38, 39 and 41).

It will be observed that the finishing mold operating mechanism serves not only to raise, open and close the mold sections at the proper times to receive and release the glass blank or bulb, but also serves to tip and raise the mold so that at the proper time in the operation of the machine the mold, after releasing a glass blank or bulb, will be automatically tipped into the water-tank X (Fig. 2). The mechanism is preferably so timed that the mold will be open when it passes through the water-tank.

*The air control.*

Although I have indicated for the purpose of outlining in connection with my present invention the machine of my said pending application No. 570,621, the air-supply for cooling the gathering mechanism &c., still, so far as the present invention is concerned, the air-control involves the following features, to wit:

The high pressure air-supply and control the low pressure air-supply and control, and the mechanism for relieving air-pressure in the blank.

The mechanism illustrated in the drawings is provided with three continuous annular or air-chambers (Fig. 45) in the upper part of the central drum. The chamber 188 is the vacuum chamber in which the air is maintained at less than atmospheric pressure and by suitable conduits, valves and mechanisms this partial vacuum is utilized in connection with the gathering mechanism to draw the metal or fluid glass from the tank into the gathering mechanism. This feature, however, has nothing to do with my present invention. The chamber 189 is, in any convenient manner, constantly supplied with air at a pressure higher than atmospheric pressure, but a relatively low pressure, anywhere from one to two ounces upward, so far as the terms high pressure and low pressure are used herein with reference to the blowing of the blank. The chamber 190 is constantly supplied by any convenient mechanism with pressure higher than the approximately constant pressure in the chamber 189 and is herein referred to as the high pressure chamber. As these chambers are in a stationary part of the structure, pipes to supply the same with air at the desired pressure may be tapped into them at any convenient point.

Each of these air pressure chambers is provided with an annular port 193 and 194, respectively. Parallel with each of these annular ports are annular packing grooves 195 filled with packing material to provide air-tight joints. Two of these grooves are arranged between the adjacent air ports.

The top spider K is provided with corresponding chambers, to wit, a vacuum chamber 196, a low pressure chamber 197, and a high pressure chamber 198, which are, respectively, provided with segmental ports 199, 200 and 201, connecting respectively with the corresponding ports of the air-chambers so that each of these chambers in the rotating upper spider is kept in constant communication with the corresponding chamber in the central column of the machine (Fig. 45).

The under face of the top spider is formed with downwardly extending annular projections which fit into the packing grooves 195, and with bearing faces which rest upon the upper bearing face or surface of the central column. In this way communication between adjacent chambers is sealed (Figs. 2 and 45). At 202 and 203 (Fig. 45), the under surface of the upper spider is formed with an annular groove and at some convenient point bosses are formed, one of which extends across the chamber 196 and the other across chambers 196 and 197, as indicated in dotted lines in Fig. 45. Holes are drilled, leading from the top of the upper spider, through these bosses and through the webs 204 and 205 respectively (Fig. 45) into the annular grooves 202 and 203. This arrangement serves a double purpose: First, it provides a convenient means for supplying oil to the bearing surfaces between the upper spider and the upper surface of the air control of the second column, and, second, it provides a vent so that in case of leakage from either of the chambers 196, 197 or 198 past the packing rings in the grooves 195, such leakage will escape to the outside of the machine and cannot communicate with the next adjacent air-chamber, and therefore cannot in any way disturb the required air pressure therein.

*The high pressure air.*

From the high pressure chamber 198 in the upper spider K (Fig. 46) a port 206 communicates with a passage 207 in a valve casing 208, which valve casing is secured to the underside of the web 209 of the upper spider K. The passage 207 leads to a valve chamber 210, which is closed by a plug 211, and is provided with a bushing 212, in which is provided an air port, normally closed by a valve 213. To insure the accurate setting of this valve I provide a washer 214 having a central conical point 215 which bears upon the center of the valve 213 and is under pressure of a spring 216. The stem 217 of the valve 213 extends through a chamber 218 and through the valve casing 208, and extends also through a spring 219 seated in a chamber 220 in the valve casing 208.

Mounted to reciprocate within the chamber 220 is a plunger 221 which is normally held out of contact with the valve stem 217 by the spring 219. A pin 222 extending into a slot 223 in the plunger 221 holds the plunger 221 from being forced out of the chamber 220 by the expansion of the spring 219. The plunger 221 extends through a stuffing box 224 and is provided at its outer end with a roller 225. Projecting in the path of the roller 225 are cams 226. Leading from the chamber 218 to a valve chamber 227 is a passage-way 228. The valve chamber 227 is provided with a plug 229, a nipple 230, a valve 231, a washer 232, and a spring 233, substantially the same as the corresponding parts in the valve chamber 210.

The chamber 234 in the nipple 230 communicates with a pipe 235 which leads to the hose 60 leading to the air pipe 59 at one end of the spindle. A stem 236 of the valve 231 extends into a chamber 237 in the valve casing 208, through a spring 238. A plunger 239 is arranged to reciprocate within the chamber 237, extends through a stuffing box 240, is held in place by a pin 241 and is held normally out of contact with the valve stem 236 by the spring 238. This plunger 239 is provided with a roller 242, and cams 243 extend in the path of the roller 242, said cams being secured to the central drum or column M.

The cams 226 and 243 may be arranged in such relation to each other that one of the cams 226 will contact with the roller 225, and pass out of contact with the roller 225 just before one of the cams 243 contacts with the roller 242. The result when this arrangement is used is that whenever a cam 226 contacts with the roller 225, the plunger 221 will be driven sharply forward, thereby quickly opening the air valve 213 and permitting high pressure air from the air-chamber 198 to fill the chamber 218, the passage 228, and the chamber 227. As one of the cams 226 passes out of contact with the roller 225, the plunger 221 will be quickly moved out of contact with the valve stem 217 by the action of the spring 219, and the valve 213 will be sharply closed, leaving the chamber 218, passage 228, and chamber 227, filled with a definite quantity of air under a definite predetermined pressure. Immediately thereafter, one of the cams 243 contacting with the roller 242 will open the valve 231 and thereupon said definitely measured quantity of air under a predetermined pressure will extend through the pipe 235, and communicating pipes and hose into the spindle, and through the spindle into the plastic blank, providing a blank is at the time secured in the jaws of the spindle, thereby subjecting the blank to a puff of air of definite quantity and under definite pressure. This operation is repeated whenever required. It should be understood, however, that if desired the cams 226 and 243 may be so arranged that the valves 213 and 231 will be simultaneously opened.

*The low pressure air.*

The low pressure air chamber 197 in the upper spider K is at intervals cored or extended down through the high pressure air chamber 198, and is in communication with valves and chambers arranged in a valve casing 244 which is secured to the under side of the upper spider K (Fig. 47). Said valves and chambers may be arranged and actuated exactly as the high pressure valves and chambers shown in Fig. 46, and communicate through a branch pipe 245 with the air-pipe 235 leading to the air-pipe at one end of the spindle.

The low pressure air valve casings and valves may be in structure and operation essentially the same as the high pressure valves and casings and are so shown, except that from the chamber in the low pressure valve casing, corresponding to the chamber 227 in the high pressure casing (Fig. 46), a port leads through a lug 246, with which lug the pipe 245 is connected, and in the low pressure casing a chamber corresponding to the chamber in the high pressure casing opens directly to the atmosphere through a lug or nozzle 247, so that the upper valve indicated at 248 in Fig. 47 controls the flow of air from the low pressure chamber to the valve casing while the lower valve, indicated at 249 in Fig. 47 opens a vent or outlet to the atmosphere from the pipes 235 and 245.

In practice I prefer to use about ten pounds pressure to the square inch, for the high pressure air, and about five ounces pressure to the square inch for low pressure air. The pressure supplied to the air-chambers can, however, be varied, controlled and maintained as desired by any suitable pressure regulating device.

I have obtained excellent results by admitting the air in puffs to the spindle, either in measured quantities by opening the valves 213 and 231 in succession, or by admitting the air directly by simultaneously opening said valves, and then quickly opening the relief valve 249 so as to relieve all pressure in the interior of the blank. This manner of manipulation of the blank has in my experience produced a more quick distribution of glass if the air pressure is thus applied and relieved while the glass is still very soft. For example, when the spindle has received the blank and is still in upright position, I admit successively two or three puffs of high pressure air to the spindle and thence to the interior of the blank, this air-pressure being at once relieved, through the relief valve, after each puff, whereupon the blank tends to sink down and flatten out upon itself in a mushroom-like shape after each puff. I believe that this manipulation not only produces a more even distribution of glass in the walls of the bulb or other article being blown, but, by allowing the cooler glass to settle back toward the hotter part of the blank reheats it and produces a more even distribution of heat in the blank, whereby the ultimate result of an even distribution of glass throughout the walls of the bulb or other article being blown is more readily obtained.

When the shaping of the blank has been substantially completed in the finishing molds and the blank is rapidly cooling and becoming set, although still somewhat plastic, I have the machine so adjusted as to admit full, direct, high pressure air to the interior of the blank, whereby the blank is blown to its molded form and is externally supported in the mold, but, just as the mold is about to open, since the blank or bulb may still be sufficiently plastic to be distorted by the continued application of high pressure air when no longer externally supported by the mold, and, on the other hand, may still be sufficiently plastic to collapse if pressure is entirely withdrawn, while the cooling air within the bulb contracts, I cause the machine to shut off the high pressure air and admit the low pressure air only. This low pressure air will be insufficient to now expand the partially cooled bulb, but will be sufficient to internally support the bulb even though it is still partially plastic. Consequently, as the finishing mold opens, the bulb, upon being exposed to the external atmosphere, becomes finally set without collapsing or distortion before the jaws of the spindle open and release or deliver the completed bulb.

It must be understood that the particular arrangement of valve actuating cams, as typically shown in various of the figures of the drawings, is not essential and is largely arbitrary, as these cams are preferably adjustable about the periphery of the central column, and the exact position of these cams with relation to each other and with relation to the operating parts may be changed as conditions or experience may suggest or require, the arrangement illustrated being merely one which I have found to be effective.

*The operation of the complete machine.*

With my present invention embodied in the specific form shown in the accompanying drawings and used in connection with the associated mechanisms indicated, especially in Fig. 1 of the drawings, and with the parts adjusted in the specific arrangement shown in the drawings, a typical operation of one glass-working unit during one complete cycle or revolution of the spiders, beginning just before the rotation of the spiders brings the parts to the position shown at the right-hand of Fig. 1 is as follows:

(1) As the rotation of the spiders brings the glass-gathering mechanism or ram opposite the opening in the furnace, the ram is caused to travel forwardly and downwardly into the working opening of the furnace, as explained in detail in my application No. 570,621, and by means of suitable mechanism the glass-gathering device or ram is arrested in its movement about the axis of the machine while the spiders continue their travel.

(2) By a suitable mechanism communication is opened between the gathering end of the ram and the vacuum chamber in the upper spider whereby the metal is sucked up into the gathering end of the ram from the body of metal in the furnace, whereupon the ram is caused to retreat, the surplus metal is cut off at the inlet end of the gathering mechanism and as the ram completes its return travel the parts assume the position shown at the right-hand side of Fig. 1.

(3) About simultaneously with the completion of the inward movement of the ram, the spindle-swinging cam actuates the spindle-swinging mechanism so that the spindle comes to the vertical position shown in Fig. 2.

(4) As the spindle reaches this position the centering arms 129 clasp it and the spindle and delivery end of the gathering mechanism arrive at a position in axial alinement with each other and the ram now resumes its travel with the spiders so that the delivery end of the gathering-mechanism continues in axial alinement with the spindle until the gathered blank is delivered to the spindle.

(5) As the ram and spindle now travel in unison about the axis of the machine, the bell-crank-actuating cam causes the bell-crank 8 to raise the spindle vertically and, about simultaneously therewith, the yoke operating cam rocks the yoke-lever 43 downwardly against the flange 45 on the bottom of the spindle, causing the spindle jaws to open and the parts to assume the position shown in Fig. 7.

(6) At the same time, by a suitable mechanism, such as that fully explained in said application No. 570,621, the delivery end of the gathering mechanism is caused to open immediately after the spindle jaws have opened, whereupon the rod and plastic blank is delivered or dropped into the plunger tip 38 of the spindle.

(7) At this point, the yoke-actuating cam raises the yoke out of contact with the flange 45 on the bottom of the spindle, whereupon the spindle jaws are closed by the expansion of spring 25, and at the same time the cam which actuates lever 54 causes the lever 54 (Fig. 2) to strike the lower end of the secondary plunger 50 on the spindle (Fig. 5) so that as the spindle jaws close upon the blank the plunger tips 38 and 51 simultaneously move toward the thimbles 27 on the spindle jaws 15, and the secondary plunger tip 51 is not only forced into the plastic blank 253, but closes the central port through the plunger tip 38 so that none of the glass composing the blank will be squeezed into said port (Fig. 3). The blank, being plastic, is thus tightly sealed between the plunger tip 38 and the thimbles 27 on the spindle jaws, so that no air can escape around the blank, an air-chamber is started or pressed in the blank by the end of the secondary plunger tip 51, and by contact with these relatively cool surfaces, the blank is stiffened and chilled immediately adjacent to the plunger tips.

(8) Immediately after the blank is sealed in the end of the spindle, as above noted, the cam which actuates lever 54 operates to permit lever 54 to be carried down or away out of contact with the lower end of the secondary plunger 48, whereupon the expansion of the spring 53 unseats the secondary plunger tip 51 from the port through the plunger tip 38, thereby leaving an unobstructed air passage through the spindle to the interior of the blank.

(9) While the spindle still remains in vertical position, the air-control apparatus operates to simultaneously open the high-pressure air valves 213 and 231, thereby admitting a puff of high pressure air into the blank.

(10) Immediately following this puff, the mechanism operates to open the relief valve 249, whereby the air pressure in the blank is relieved and the expanded and relatively cool part of the blank settles back on the warmer portion of the blank (Fig. 53).

At this point another puff of high pressure air is admitted to the interior of the vertically held blank and is immediately relieved by the opening of the relief valve, this second puff serving to still further expand the blank (Fig. 54).

(11) At about this point, the spindle-rotating cam causes the spindle to rotate on its longitudinal axis, preferably first in one direction and then in the reverse direction, and another puff of air is admitted to the blank and immediately relieved.

(12) Following this third puff of air, the spindle-swinging cam causes the mechanism actuated by it to swing the spindle downwardly about the horizontal axis of the bracket 11, and as it starts to swing downward, another puff of air is admitted to the interior of the blank and immediately relieved.

(13) The spindle is now caused by the operation of the spindle-swinging cam to swing backwards and forwards in a series of gradually shortening oscillations or pendulum-like movements (Fig. 27), whereby the blank is swung out or elongated (Fig. 55).

(14) The machine now causes the open molds to rise preparatory to receiving the blank.

(15) As the oscillations of the spindle stop, another puff of air is admitted to the blank and relieved, and the spindle centering device clasps the spindle and holds it in axial alinement with the finishing molds.

(16) The molds now close about the blank.

(17) While the blank is contained in the molds the spindle, still carrying the blank, rotates constantly on its longitudinal axis, preferably first in one direction and then in the reverse direction.

(18) While the spindle is thus rotating the blank in the closed mold, the low pressure air valve is gradually opened, so as to gradually admit low pressure air to the interior of the blank, and then the high pressure valves are opened wide and the blank is internally subjected to the maximum air-pressure which is used in blowing the blank, which pressure is continued until just before the finishing molds open.

(19) At this point, just before the finishing molds open, the air valves are closed so that the blank will not be subjected to further internal pressure after the molds open but, as the blank is now fully expanded, and is substantially "set" as a finished bulb, the relief valve is not opened when the air valves are closed. Consequently, when the finishing molds open the compressed air admitted to the bank or bulb is still confined there, and while it serves to support the walls of the bulb and prevent any collapse when these walls are no longer supported by the finishing mold, the air so confined does not further expand the bulb. This may be due in part to the fact that the enclosed compressed air has been highly heated and expanded while the blank was confined in the mold and is rapidly cooling and contracting when the blank is exposed to the outer air so that it just sufficiently supports the still somewhat plastic bulb until it is definitely set. Under some conditions this result can be most satisfactorily attained by allowing the low pressure air valve to remain open slightly after the high pressure valves have been closed, so as to compensate to any necessary extent for any lessening of pressure resulting from contraction of the cooling air.

(20) The finishing molds now open and descend into the water tank, and shortly thereafter the jaws on the spindle open and deliver the finished bulb, and the cycle of rotation has been completed.

The foregoing cycle of operation has been explained merely for the purpose of stating a typical operation of the machine, when all of the features explained are used, and the successive steps are indicated in Figs. 48 to 58, inclusive, but it will be readily seen that these steps may be varied within a wide range, even if the machine be used complete with all of the parts which I have shown and described, or, my present invention may be used to good advantage with only a part of said mechanisms. Such variations, however, are merely matters of shop expedients and convenience, as experience or differing conditions may suggest, and in particular the manner, character and frequency of the puffs of air used, and the particular times at which they are admitted to the interior of the blank, are matters as to which a wide range of variation is permissible. So far as the mechanisms of my invention are concerned these are matters of no moment.

It will be noted that where springs are used in my machine they are mostly used to operatively actuate the mechanisms with which they are associated so that such mechanisms are always under tension to do their work, and yet if they encounter unexpected resistances, such as a hardened blank or other obstruction in the mechanism, the fact that they are spring-actuated to do their work enables them to yield to such obstructions without injury to the mechanism. Therefore the positive movements of the mechanisms are largely movements whereby a device is withdrawn from its work and against the action of its actuating spring. This feature I consider a great advantage in a machine of this character and I have used it wherever possible.

It must be constantly borne in mind, however, that the particular machine illustrated and described is merely a typical embodiment of my present invention in what I believe to be its preferred form, and in connection with what I consider its most desirable associated mechanisms, but the specific construction described herein is merely by way of illustration and is not by way of limitation or narrowing of my claims, as obviously a great many changes in construction and design can be made without departing from my invention and, obviously also, various of the features described can be omitted, leaving the machine still operative to usefully do certain of the work described, and such changes are contemplated by me and would not involve any departure from my invention. Thus, for example, any suitable gathering mechanism may be used, parts of the spindle mechanism may be omitted, the spindle may be constructed and operated to perform only a part of the functions described, the spindle may be used without the intervention of the finishing molds, the spindle may be supplied with air by any means effective to that end and with or without the variations of air pressure which I have described. With reference to the successive steps illustrated in Figs. 48 to 58, I note that in Fig. 48 the gathering mechanism is just dipping into the molten glass or metal, the partial vacuum in the gathering mechanism having drawn the metal into the blank forming mold of the gathering mechanism. In Fig. 49 the gathering mechanism is withdrawing from the pot or furnace and the cut-off knife is shearing off the surplus metal at the feed end and delivery port of the blank forming or neck molds. In Fig. 50 the upper end of the spindle mechanism is shown in alinement with the neck molds of the gathering mechanism, with the spindle jaws open. The blank forming or neck molds of the gathering mechanism are also shown as open and the blank 253 is dropping into the upper end of the spindle or blow-pipe. In Fig. 51 the spindle jaws have clamped and spread out the collar molded on the blank 253 so that the blank is securely sealed between the spindle jaws and the plunger tip 38, while the second plunger tip 51 has risen and formed the initial chamber in the blank 253. In Fig. 52 the second plunger tip 51 is withdrawn from the opening in the plunger tip 38 and the initial puff of air under pressure has been admitted to the interior of the blank, partially expanding the blank 253 in the upward direction. In Fig. 53 the air pressure in the blank has been relieved and the expanded part is shown as settling back by gravity. In Fig. 54 the blank as shown has still further expanded by the next puff of air under pressure. In Fig. 55 the blank has been swung outwardly and downwardly, thereby elongating it as shown. In Fig. 56 the blank has been further expanded by air pressure and is ready to be received in the finishing molds. In Fig. 57 the blank is shown as fully expanded in the finishing molds and Fig. 58 shows the finished bulb.

It is my purpose and intention to hereby claim generically as well as specifically each and every of the features of my present invention which I have shown and described which are patentably novel and which may be claimed in the present application.

It is, of course, understood that I do not here claim any invention here disclosed which is disclosed and claimed either in the parent application, Serial No. 570,621, or any other of my divisional applications, Serial Nos. 620,555, 620,556, 622,244, or 628,225, the present application being limited to the spindle, the specific features thereof, all proper combinations and subcombinations thereof, and all legitimate combinations of the particular spindle and spindle mechanism with the other parts of the machine.

I claim:

1. The combination with a glass working spindle of means for automatically and periodically reciprocating said spindle longitudinally and means for automatically and periodically moving said spindle about its longitudinal axis.

2. The combination with a glass working spindle of means for automatically and periodically reciprocating said spindle, means for automatically and periodically moving said spindle about its longitudinal axis and means for oscillating said spindle about an axis other than its longitudinal axis.

3. The combination with two supports of means for producing a relative travel between said supports, a spindle carried by one of said supports and means actuated by the travel between said supports, for admitting compressed air into said spindle in definite volume.

4. The combination with two supports of means for producing a relative travel between said supports, a spindle carried by one of said supports and means, actuated by the relative travel between said supports, for periodically reciprocating said spindle longitudinally in a vertical plane.

5. The combination with two supports of means for producing a relative travel between said supports, a spindle carried by one of said supports and means actuated by the relative travel between said supports for oscillating said spindle about its longitudinal axis.

6. The combination with a glass-working spindle, of means for oscillating said spindle on an axis other than its longitudinal axis and means for automatically admitting air under pressure to said spindle at definite intervals and during the oscillation of said spindle.

7. The combination with a glass-working spindle, of gathering mechanism, means for automatically actuating said spindle to receive a blank from said gathering mechanism, and means for automatically actuating said spindle to develop said blank to desired form.

8. The combination with a glass-working spindle, of gathering mechanism and mold mechanism, of means for supplying a blank from said gathering mechanism to said spindle, means for actuating said spindle to develop said blank outside of said mold, and means for actuating said spindle and said mold mechanism whereby the blank will be enclosed in the mold and will thereupon be developed to the desired form by the further operation of said spindle.

9. Glass working mechanism comprising a spindle adapted to receive a plastic blank in its upper end while in vertical position, and means for automatically supplying puffs of compressed air to the interior of said blank while in vertical position and for relieving the air pressure in the blank between successive puffs, whereby the plastic blank is permitted to sink back upon itself.

10. Glass working mechanism comprising a spindle adapted to receive a plastic blank in its upper end while in vertical position, means for automatically supplying puffs of compressed air to the interior of said blank while in vertical position and for relieving the air pressure in the blank between successive puffs, whereby the plastic blank is permitted to sink back upon itself, and mechanism for causing said spindle to then swing out the blank.

11. The combination with glass gathering and blank forming means, of glass working means arranged to receive the blank so formed, said means comprising mechanism for providing an air tight seal between the blank and said working means and for mechanically producing a recess in the interior of said blank.

12. The combination with glass gathering and blank forming means, of glass working means arranged to receive the blank so formed, said means comprising mechanism for providing an air-tight seal between the blank and said working means and for mechanically producing a recess in the interior of said blank and for then supplying successive puffs of air under pressure to the interior of said blank.

13. The combination with glass gathering and blank forming means, of glass working means arranged to receive the blank so formed, said means comprising mechanism for providing an air-tight seal between the blank and said working means and for mechanically producing a recess in the interior of said blank and for then supplying successive puffs of air under pressure to the interior of said blank, and for swinging out said blank.

14. A glass working device comprising a spindle provided with means for receiving a plastic blank from a gathering device, a means for automatically actuating the means for spindle to receive the blank, and means for actuating the spindle to develop the blank by swinging out and blowing.

15. The combination with a glass working device of a spindle comprising means for receiving a plastic blank, of means for automatically actuating the spindle to so receive the blank and means for actuating the spindle to develop the blank by blowing and by mechanical manipulation of said spindle.

16. A glass working spindle comprising a shell, a pair of jaws carried at one end of said spindle, mechanism for opening and closing said jaws, a plunger arranged to reciprocate within said shell and provided with a plunger tip adapted to clamp a plastic blank against said jaws when closed, said spindle being provided with an air passage leading to the interior of said jaws in combination with means for automatically and periodically actuating said jaws and plunger.

17. A glass working spindle comprising a sleeve or shell, blank engaging jaws supported on said shell, means for automatically opening and closing said jaws, a hollow plunger longitudinally movable within said shell and provided with a plunger tip having a passage therethrough communicating with the interior of said plunger, means for actuating said plunger so as to clamp a blank between said jaws and said plunger tip, a second plunger longitudinally movable within said first plunger and provided with a tip adapted to be seated in and to project through the passage through said first plunger tip, means for automatically actuating said second plunger so as to seat and unseat said second plunger tip in the passage through said first plunger tip, and means for supplying air under pressure to the passage through said plunger tip.

18. A glass working spindle comprising a shell, a plunger mounted therein and longitudinally movable therein, jaws supported by said shell, spring-actuated mechanism for holding said jaws in closed position, means for automatically opening said jaws, a plunger tip mounted upon said plunger, spring-actuated mechanism for holding said plunger tip in a position to clamp a blank between said plunger tip and said jaws when closed, means for automatically retracting said plunger tip from said clamping position, and means for automatically supplying air under pressure through said spindle to the interior of the blank clamped in said jaws.

19. A glass working spindle comprising a shell or sleeve, jaws supported by said shell, spring-actuated mechanism for normally holding said jaws in closed position, means for automatically opening said jaws, a hollow plunger mounted within said shell and longitudinally slidable therein, a plunger tip adapted to be moved by said plunger to clamp a blank between said plunger tip and said jaws, said plunger tip being provided with an air passage, spring-actuated mechanism for holding said plunger and said plunger tip in said clamping position, means for automatically retracting said plunger against the action of said spring-actuated mechanism, a second plunger longitudinally movable in said first plunger and provided with a tip adapted to partially project through the passage in said first plunger tip and to be forced into a plastic blank clamped between said plunger tip and said jaws, spring-actuated mechanism for holding said second plunger tip out of engagement with said first plunger tip when the latter is in clamping position, automatic means for forcing said second plunger tip through said first plunger tip against the action of said last-named spring-actuated mechanism, and means for automatically supplying air under pressure to the interior of a blank when clamped between said jaws and said first plunger tip.

20. In a glass-working spindle, the combination of means carried by said spindle for detachably sustaining a plastic blank, and automatically actuated means for actuating said spindle to periodically and successively engage the blank and release the formed article.

21. In a glass-working spindle, the combination of means carried by said spindle for sustaining a plastic blank, automatically actuated means for rotating said spindle on its longitudinal axis, means for oscillating the spindle on a different axis and means for automatically supplying air under pressure to the interior of said spindle while being so rotated or oscillated.

22. In a glass-working spindle, the combination of means carried by said spindle for sustaining a plastic blank, automatically actuated means for rotating said spindle on its longitudinal axis, means for oscillating said spindle on a different axis, and means for reciprocating said spindle.

23. The combination with a glass-working spindle, of means carried thereby for supporting a plastic blank, and means for automatically and periodically oscillating said spindle on an axis other than its longitudinal axis.

24. The combination with a glass working spindle, of means carried thereby for supporting a plastic blank, and means for automatically and periodically oscillating said spindle through a vertical plane and about a horizontal axis.

25. The combination with a glass working spindle, of means carried thereby for supporting a plastic blank, and automatically actuated means for swinging said spindle in a vertical plane through a series of gradually decreasing oscillations.

26. The combination with a glass working spindle, of means for automatically and periodically oscillating the same in a vertical plane and for simultaneously supplying thereto air under pressure.

27. The combination with a glass working spindle, of means for automatically oscillating the same in a vertical plane through a series of gradually decreasing oscillations, and means for simultaneously supplying puffs of air to the interior of said spindle.

28. The combination with a glass working spindle, of a support therefor, means for automatically reciprocating said spindle on its longitudinal axis, and means for swinging said spindle, through the arc of a circle, upon a horizontal axis.

29. The combination with a glass working spindle, of a support therefor, means for automatically and periodically reciprocating the spindle on its longitudinal axis, and means for oscillating the spindle.

30. The combination with a glass working spindle, of a support therefor, means for reciprocating the spindle on its longitudinal axis, means for swinging the spindle in a vertical plane about a horizontal axis, and means for rotating the spindle upon its longitudinal axis.

31. The combination with mechanical glass working mechanism, of a source of air supply under pressure, a conduit for conducting air under pressure from said source of supply to said working mechanism, two communicating valves arranged successively in said conduit, and means for automatically actuating said valves either simultaneously or successively, whereby air under pressure is supplied to said working mechanism in puffs said means comprising two supports one of which carries said valves, means for providing a relative travel between the supports and means whereby said valves are so actuated by said relative travel between said supports.

32. In a glass blowing machine, a blow pipe automatically and periodically actuated, means located at the uppermost end of the blow pipe when in an inverted position, for receiving and holding one end of a plastic glass blank, automatic means for reversing the position of the pipe and automatic means for expanding the blank by air pressure when the blow pipe is in either position.

33. The combination with mechanical glass working mechanism, of a supply of high pressure air, a supply of low pressure air, and automatically operated means for admitting puffs of air to said working mechanism from said sources of supply either at high pressure or at low pressure, or at both pressures successively, at will.

34. The combination with mechanical glass working mechanism, of means for supplying puffs of air thereto at high pressure or at low pressure at will, and means for automatically relieving the air pressures, so supplied to the working mechanism, after each puff of air admitted thereto by the aforesaid means for supplying air under pressure.

35. The combination with a stationary support, of a movable support continuously rotating about said stationary support, a glass working spindle carried by said movable support, a cam carried by said stationary support, and means, carried by the rotating support, periodically co-acting with said cam to reciprocate said spindle on its longitudinal axis.

36. The combination with a stationary support, of a movable support continuously rotating about said stationary support, a glass working spindle carried by said movable support, a cam carried by said stationary support, and means, carried by the rotating support, periodically co-acting with said cam to oscillate said spindle upon a horizontal axis.

37. The combination with a stationary support, of a movable support continuously rotating about said stationary support, a glass working spindle carried by said movable support, a cam carried by said stationary support, and means, carried by the rotating support, periodically co-acting with said cam to admit air under pressure to the interior of said spindle in successive puffs.

38. The combination with a stationary support, of a movable support continuously rotating about said stationary support, a glass working spindle carried by said movable support, a cam carried by said stationary support, and means, carried by the rotating support, periodically co-acting with said cam to rotate said spindle upon its longitudinal axis.

39. The combination with a stationary support, of a movable support continuously rotating about said stationary support, a glass working spindle carried by said movable support, a cam carried by said stationary support, and means, carried by the rotating support, periodically co-acting with said cam to swing said spindle through a series of decreasing oscillations about a horizontal axis carried by said rotating support.

40. The combination with a stationary support, of a movable support rotating about said stationary support, a spindle carried by said movable support, clamping jaws carried by said spindle, means for holding said jaws in closed position, a cam mounted on said stationary support, and mechanism carried by said rotating support and co-acting with said cam to periodically open said jaws.

41. The combination with a stationary support, of a movable support rotating about said stationary support, a spindle carried by said movable support and comprising a secondary plunger longitudinally movable within said spindle, and means for normally holding said secondary plunger in position of rest, a cam mounted on said stationary support, and mechanism carried by said rotating support co-acting with said cam to periodically move said secondary plunger longitudinally in said spindle and away from its position of rest.

42. The combination with a stationary support, of a movable support rotating about said stationary support, a spindle carried by said movable support, cams mounted upon said stationary support, mechanism on said movable support co-operating with one of said cams to reciprocate said spindle longitudinally, and other mechanism carried by said rotating support co-operating with another of said cams to admit air under pressure to the interior of said spindle in puffs of limited duration.

43. The combination with a stationary support, of a movable support rotating about said stationary support, a spindle carried by said movable support, cams mounted upon said stationary support, mechanism on said movable support co-operating with one of said cams to supply air under pressure to said spindle in controllable quantities, and other mechanism carried by said movable support and co-operating with another of said cams to swing said spindle upon a horizontal axis.

44. The combination with a stationary support, of a movable support rotating about said stationary support, a spindle carried by said movable support, cams mounted upon said stationary support, mechanism on said movable support co-operating with one of said cams to supply air under pressure to said spindle in controllable quantities, other mechanism carried by said movable support and co-operating with another of said cams to swing said spindle upon a horizontal axis, and other mechanism carried by said rotating support and co-acting with another of said cams to periodically bring said spindle to a predetermined position of rest.

45. The combination with a stationary support, of a movable support rotating about said stationary support, a spindle carried by said movable support, cams mounted upon said stationary support, mechanism on said movable support co-operating with one of said cams to supply air under pressure to said spindle in controllable quantities, other mechanism carried by said movable support and co-operating with another of said cams to swing said spindle upon a horizontal axis, other mechanism carried by said rotating support, and co-acting with another of said cams to periodically bring said spindle to a predetermined position of rest, and other mechanism carried by said rotating support and co-acting with another of said cams to rotate said spindle upon its longitudinal axis.

46. The combination with a support, of a bracket carried thereby, said bracket being rotatable upon a horizontal axis, of a spindle slidable and rotatable upon said bracket, said spindle comprising jaws adapted to clamp a plastic blank, and means for normally holding said jaws in closed position, a plunger longitudinally movable within said spindle and provided with a plunger tip adapted to clamp a plastic blank against said jaws, means for normally holding said plunger tip in clamping position, a second plunger longitudinally movable within said first plunger and provided with a tip adapted to be forced into a plastic blank clamped in said jaws, means for normally holding said second plunger tip away from said jaws, means for periodically reciprocating said spindle upon said bracket, means for periodically opening said jaws, means for periodically moving said second plunger tip towards said jaws, means for admitting air under pressure to the interior of said spindle in controllable quantities, means for swinging said bracket upon its horizontal axis and with it said spindle, and means for rotating said spindle upon its longitudinal axis.

47. The combination with a support, of a glass working spindle mounted thereon, finishing molds, means for oscillating said spindle upon a horizontal axis, means for supplying air under pressure and in controllable quantities through said spindle to the interior of a blank carried thereby, means for bringing the spindle and the molds into alignment with each other, means for closing the molds about a blank carried by the spindle, and means for rotating the spindle upon its longitudinal axis while the blank is so contained in the molds.

48. The combination with mechanically actuated gathering mechanism adapted to gather metal and to form the same into a blank, of a glass working spindle and finishing molds, means for periodically actuating the gathering mechanism to gather metal and to form the same into a blank, means for delivering the blank from the gathering mechanism to the spindle, means for supplying air under pressure in controllable quantities to the interior of the blank through the spindle, means for swinging the spindle on a horizontal axis, and means for closing the molds about the blank carried by the spindle and for opening the molds when the formation of the blank therein has been completed.

49. The combination with mechanically actuated gathering mechanism adapted to gather metal and to form the same into a blank, of a glass working spindle and finishing molds, means for periodically actuating the gathering mechanism to gather metal and to form the same into a blank, means for delivering the blank from the gathering mechanism to the spindle, means for supplying air under pressure in controllable quantities to the interior of the blank through the spindle, means for swinging the spindle in a series of decreasing oscillations about a horizontal axis, means for causing the molds to close about the blank carried by the spindle when said oscillations have ceased, means for rotating the spindle upon its longitudinal axis while the blank carried by the spindle is enclosed within the molds, and means for opening the molds to release the blank when the formation of the blank therein has been completed.

50. In a glass forming machine, a blowpipe, and automatically and periodically actuated means for detachably sealing thereto a plastic blank.

51. In a glass forming machine, a blowpipe, and automatically and periodically actuated means for detachably sealing thereto a previously formed, plastic blank.

52. In a glass forming machine, a blow-pipe, and automatically and periodically actuated means for detachably connecting thereto a previously formed, plastic blank.

53. In a glass forming machine, a blow-pipe, and automatically and periodically actuated means for detachably connecting a molten, plastic blank to the blow-pipe while in inverted position.

54. In a glass blowing machine, a blow-pipe, automatically and periodically actuated means at the upper end of the blow-pipe, when in inverted position, for receiving and holding only one end of a plastic glass blank, and automatically and periodically actuated means for blowing into said blank when secured to the uppermost end of the blow-pipe when in inverted position.

55. In a glass blowing machine, a blow-pipe, means at the uppermost end of the blow-pipe, when in inverted position, for receiving and holding one end of a plastic glass blank, means for reversing the position of the pipe, and means for blowing into the blank when the blow pipe is in either position.

56. The combination with a stationary support, of a movable support moving about said stationary support, a glass carrier carried by said movable support, a cam mounted on said stationary support, and means carried by said rotating support and coacting with said cam to periodically oscillate the carrier and the glass thereon upon the support to "swing" the gather, and to bring the carrier to rest at a fixed position after such oscillation.

57. The combination with a carrier for a mass of glass, of automatic means for swinging said carrier with the glass thereon in a vertical plane and about a horizontal axis through predetermined oscillations to "swing" the glass and means for automatically bringing said carrier with the glass thereon to rest at a fixed point.

58. The combination with a carrier for a mass of glass, of automatic means for swinging said carrier with the glass thereon in a vertical plane and about a horizontal axis through predetermined oscillations to "swing" the glass, and means for automatically bringing said carrier with the glass thereon to rest at a fixed point in a vertical position.

AUGUST KADOW.

Witnesses:
Thos. H. Murphy,
E. J. Marshall.

pipe, and automatically and periodically actuated means for detachably sealing thereto a previously formed, plastic blank.

52. In a glass forming machine, a blow-pipe, and automatically and periodically actuated means for detachably connecting thereto a previously formed, plastic blank.

53. In a glass forming machine, a blow-pipe, and automatically and periodically actuated means for detachably connecting a molten, plastic blank to the blow-pipe while in inverted position.

54. In a glass blowing machine, a blow-pipe, automatically and periodically actuated means at the upper end of the blow-pipe, when in inverted position, for receiving and holding only one end of a plastic glass blank, and automatically and periodically actuated means for blowing into said blank when secured to the uppermost end of the blow-pipe when in inverted position.

55. In a glass blowing machine, a blow-pipe, means at the uppermost end of the blow-pipe, when in inverted position, for receiving and holding one end of a plastic glass blank, means for reversing the position of the pipe, and means for blowing into the blank when the blow pipe is in either position.

56. The combination with a stationary support, of a movable support moving about said stationary support, a glass carrier carried by said movable support, a cam mounted on said stationary support, and means carried by said rotating support and coacting with said cam to periodically oscillate the carrier and the glass thereon upon the support to "swing" the gather, and to bring the carrier to rest at a fixed position after such oscillation.

57. The combination with a carrier for a mass of glass, of automatic means for swinging said carrier with the glass thereon in a vertical plane and about a horizontal axis through predetermined oscillations to "swing" the glass and means for automatically bringing said carrier with the glass thereon to rest at a fixed point.

58. The combination with a carrier for a mass of glass, of automatic means for swinging said carrier with the glass thereon in a vertical plane and about a horizontal axis through predetermined oscillations to "swing" the glass, and means for automatically bringing said carrier with the glass thereon to rest at a fixed point in a vertical position.

AUGUST KADOW.

Witnesses:
Thos. H. Murphy,
E. J. Marshall.

Certificate of Correction.

It is hereby certified that in Letters Patent No. 1,527,559, granted February 24, 1925, upon the application of August Kadow, of Toledo, Ohio, for an improvement in "Glass-Blowing Mechanism," errors appear in the printed specification requiring correction as follows: Page 2, line 131, for the letter and numeral " B¹ " read *B'*; page 9, line 25, for the article " a " read *at*; page 15, line 126, after the word " for " insert the words *automatically and periodically*; and that the said Letters Patent should be read with these corrections therein that the same may conform to the record of the case in the Patent Office.

Signed and sealed this 5th day of May, A. D. 1925.

[SEAL.]
KARL FENNING,
*Acting Commissioner of Patents.*

Certificate of Correction.

It is hereby certified that in Letters Patent No. 1,527,559, granted February 24, 1925, upon the application of August Kadow, of Toledo, Ohio, for an improvement in "Glass-Blowing Mechanism," errors appear in the printed specification requiring correction as follows: Page 2, line 131, for the letter and numeral " $B^1$ " read $B'$; page 9, line 25, for the article " a " read *at;* page 15, line 126, after the word " for " insert the words *automatically and periodically;* and that the said Letters Patent should be read with these corrections therein that the same may conform to the record of the case in the Patent Office.

Signed and sealed this 5th day of May, A. D. 1925.

[SEAL.] 
KARL FENNING,
*Acting Commissioner of Patents.*